United States Patent
Yamashima et al.

(10) Patent No.: US 12,288,993 B2
(45) Date of Patent: Apr. 29, 2025

(54) WIRELESS POWER RECEIVING DEVICE, WIRELESS POWER TRANSMISSION DEVICE, AND WIRELESS POWER TRANSMISSION SYSTEM

(71) Applicant: TDK CORPORATION, Tokyo (JP)

(72) Inventors: Masayuki Yamashima, Tokyo (JP); Ryo Shiozaki, Tokyo (JP); Kazuyoshi Hanabusa, Tokyo (JP); Kouichi Sakita, Tokyo (JP); Kazuki Yoneda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 708 days.

(21) Appl. No.: 17/556,636

(22) Filed: Dec. 20, 2021

(65) Prior Publication Data

US 2022/0209578 A1    Jun. 30, 2022

(30) Foreign Application Priority Data

Dec. 25, 2020  (JP) .................................. 2020-217489

(51) Int. Cl.
| | |
|---|---|
| H01M 10/46 | (2006.01) |
| H02J 50/00 | (2016.01) |
| H02J 50/10 | (2016.01) |
| H02J 50/90 | (2016.01) |

(52) U.S. Cl.
CPC ............ *H02J 50/10* (2016.02); *H02J 50/005* (2020.01); *H02J 50/90* (2016.02)

(58) Field of Classification Search
CPC .......... H02J 50/005; H02J 50/10; H02J 50/90; H02J 50/12; B60L 53/126; B60L 53/39

USPC .................. 320/104, 107, 108, 114, 115
See application file for complete search history.

(56) References Cited

U.S. PATENT DOCUMENTS

| | | | |
|---|---|---|---|
| 2007/0075765 A1 | 4/2007 | Kawagoshi | |
| 2022/0247241 A1* | 8/2022 | Robert | ................... B60L 53/38 |

FOREIGN PATENT DOCUMENTS

| | | |
|---|---|---|
| JP | H10-233235 A | 9/1998 |
| JP | 2007-97354 A | 4/2007 |
| JP | 2011-36107 A | 2/2011 |
| JP | 2017-127124 A | 7/2017 |

\* cited by examiner

*Primary Examiner* — Edward Tso
(74) *Attorney, Agent, or Firm* — Oliff PLC

(57) ABSTRACT

A wireless power receiving device that receives AC power from a power transmission coil included in a wireless power transmission device. The wireless power receiving device includes a power receiving coil configured to receive AC power from a power transmission coil, a power receiving-side imaging unit having an auto-focus function, and a control unit configured to cause the power receiving-side imaging unit to image a range able to be imaged by the power receiving-side imaging unit and, in a case in which a marker located at a predetermined first position on an outer surface of the wireless power transmission device is imaged by the power receiving-side imaging unit, to output relative distance information representing relative distance of the power receiving coil with respect to the power transmission coil based on a detected distance using the auto-focus function used by the power receiving-side imaging unit for imaging the marker.

16 Claims, 15 Drawing Sheets

FIG. 14
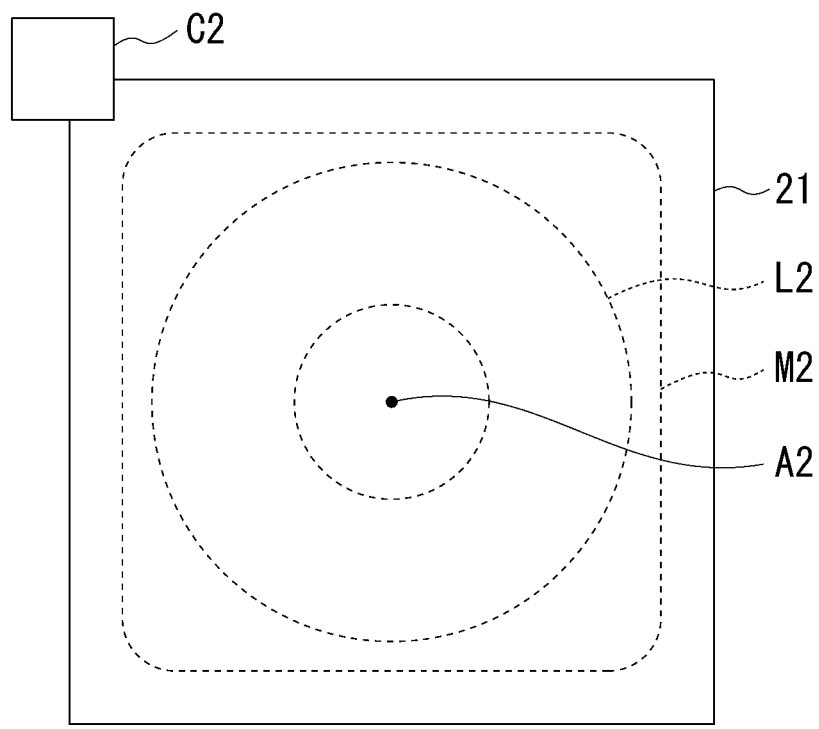
FIG. 15
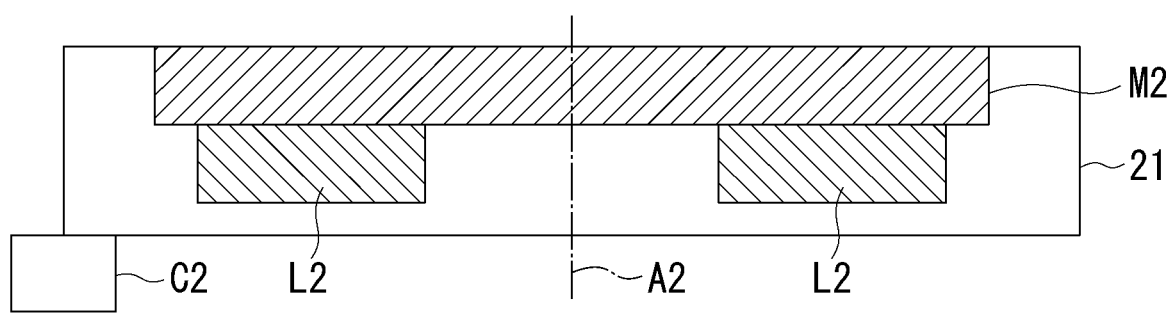
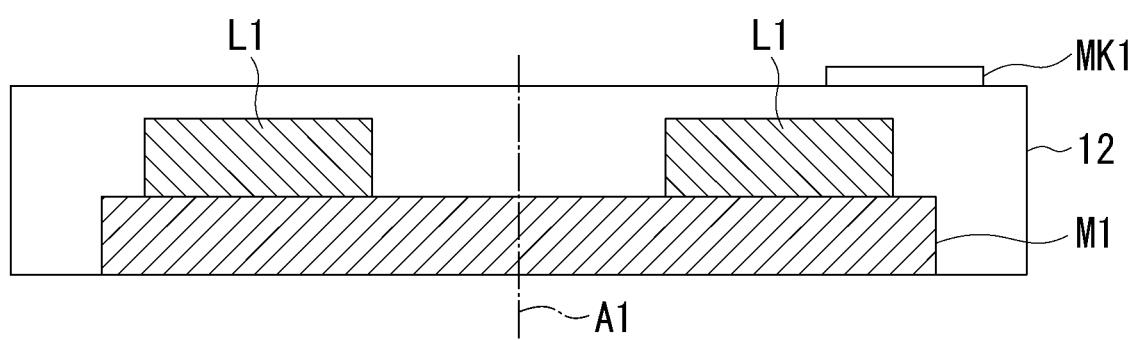

FIG. 16
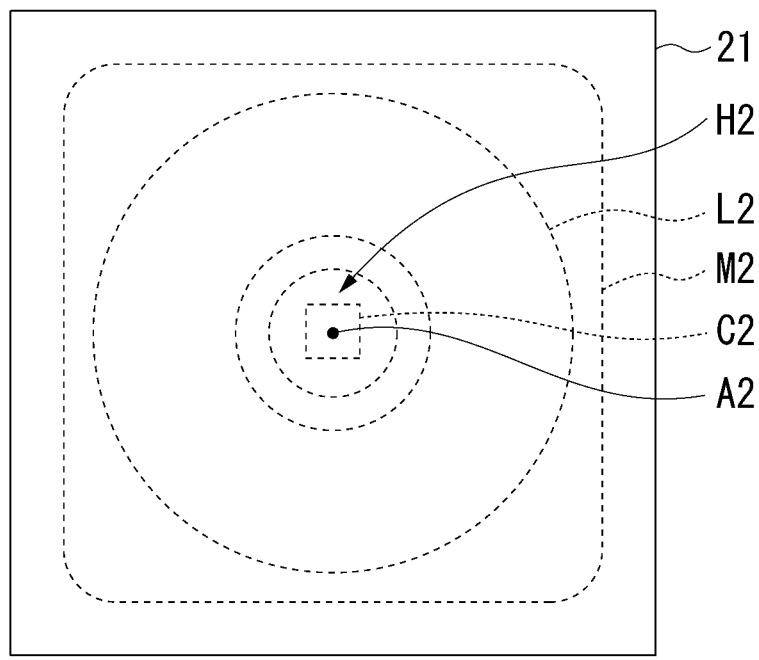
FIG. 17
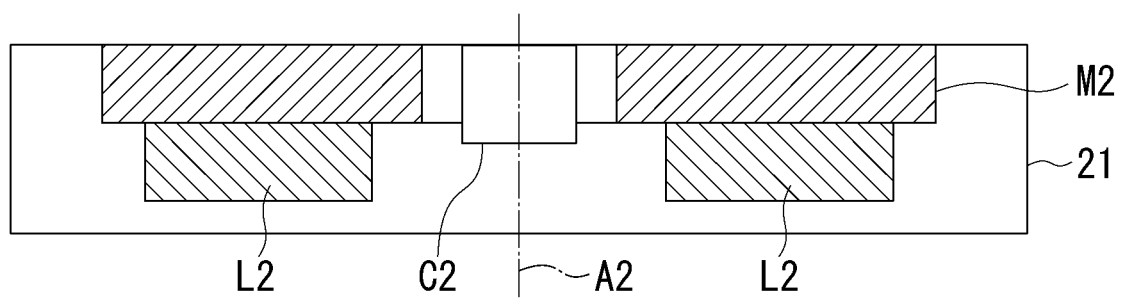
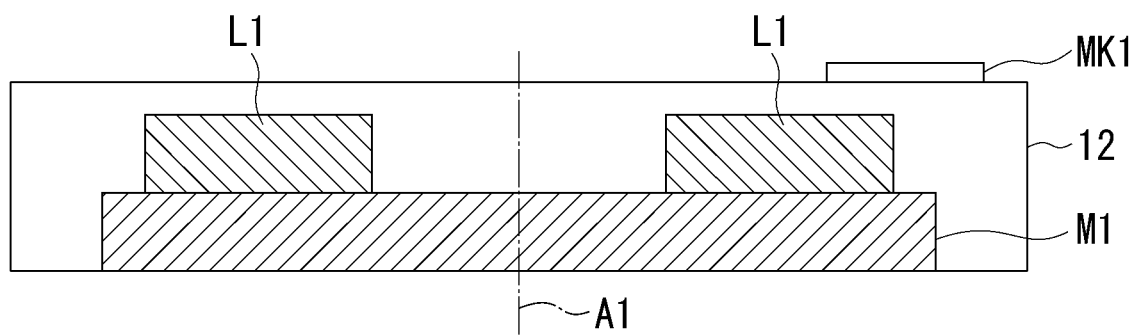

WIRELESS POWER RECEIVING DEVICE, WIRELESS POWER TRANSMISSION DEVICE, AND WIRELESS POWER TRANSMISSION SYSTEM

BACKGROUND OF THE INVENTION

Field of the Invention

The present disclosure relates to a wireless power receiving device, a wireless power transmission device, and a wireless power transmission system.

Priority is claimed on Japanese Patent Application No. 2020-217489, filed Dec. 25, 2020, the content of which is incorporated herein by reference.

Description of Related Art

Technologies relating to wireless power transmission systems performing wireless power transmission through magnetic fields have been researched and developed. In this description, wireless power transmission is transmission of electric power performed in a wireless manner.

In relation to this, a power transmission device that is disposed in a parking space and transmits electric power to a power receiving device mounted in a vehicle in a non-contact manner after radio communication with the vehicle is established is known, in which the vehicle has unique identification information disposed to be able to be imaged from the outside of the vehicle and transmits a signal for establishing radio communication in a case in which an identifier corresponding to the identification information has been received, and the power transmission device includes a communication unit configured to be able to perform radio communication with a vehicle, an imaging unit configured to be able to image identification information of a vehicle parked in a parking space, and a control unit that acquires identification information using the imaging unit, sets an identifier corresponding to the acquired identification information, transmits the set identifier to a vehicle, and establishes radio communication in a case in which a corresponding signal has been received from the vehicle (see Patent Document 1).

PATENT DOCUMENTS

[Patent Document 1] Japanese Unexamined Patent Application, First Publication No. 2017-127124

SUMMARY OF THE INVENTION

However, in a power transmission device like the one described in Patent Document 1, it is difficult to detect a difference of a distance between the power transmission device and a power receiving device. As a result, the power transmission device may not efficiently transmit electric power to a power receiving device.

The present disclosure is in view of such situations, and an object thereof is to provide a wireless power receiving device, a wireless power transmission device, and a wireless power transmission system capable of easily causing a relative distance of a power receiving coil with respect to a power transmission coil to coincide with a desired distance.

According to one aspect of the present disclosure, there is provided a wireless power receiving device that receives AC power from a power transmission coil included in a wireless power transmission device, the wireless power receiving device including: a power receiving coil configured to receive the AC power from the power transmission coil; a power receiving-side imaging unit having an auto-focus function; and a control unit configured to cause the power receiving-side imaging unit to image a range that is able to be imaged by the power receiving-side imaging unit and, in a case in which a marker located at a predetermined first position on an outer surface of the wireless power transmission device is imaged by the power receiving-side imaging unit, to output relative distance information representing a relative distance of the power receiving coil with respect to the power transmission coil based on a detection distance detected using the auto-focus function used by the power receiving-side imaging unit for imaging the marker.

According to the present disclosure, a relative distance of a power receiving coil with respect to a power transmission coil can be easily caused to coincide with a desired distance.

BRIEF DESCRIPTION OF THE DRAWINGS

FIG. 14 is a diagram illustrating an example of a positional relation between a power receiving coil L2 and an imaging unit C2 in a case in which the wireless power receiving device 20 includes the imaging unit C2.

FIG. 15 is a diagram illustrating an example of a positional relation between the power receiving coil L2 and the imaging unit C2 in a state in which the power transmission coil L1 and the power receiving coil L2 face each other.

FIG. 16 is a diagram illustrating another example of a positional relation between the power receiving coil 12 and the imaging unit C2 in a case in which the wireless power receiving device 20 includes the imaging unit C2.

FIG. 17 is a diagram illustrating another example of a positional relation between the power receiving coil L2 and the imaging unit C2 in a state in which the power transmission coil L1 and the power receiving coil L2 face each other.

DETAILED DESCRIPTION OF THE INVENTION

Embodiment

Hereinafter, an embodiment of a technology according to the present disclosure will be described with reference to the drawings. Here, a coil according to the embodiment is a conductor wound around at least one of a certain area and a certain object and does not include a conductor as a lead wire connected from such a conductor to another circuit. However, the coil may be configured to include a conductor as a lead wire connected from a conductor wound around at least one of a certain area and a certain object to another circuit. In addition, in the embodiment, a conductor wound as a coil may be a conduction wire formed in a linear shape, a conductor printed on the surface of an object, or any other conductor.

<Configuration of Wireless Power Transmission System>

Figure 1:
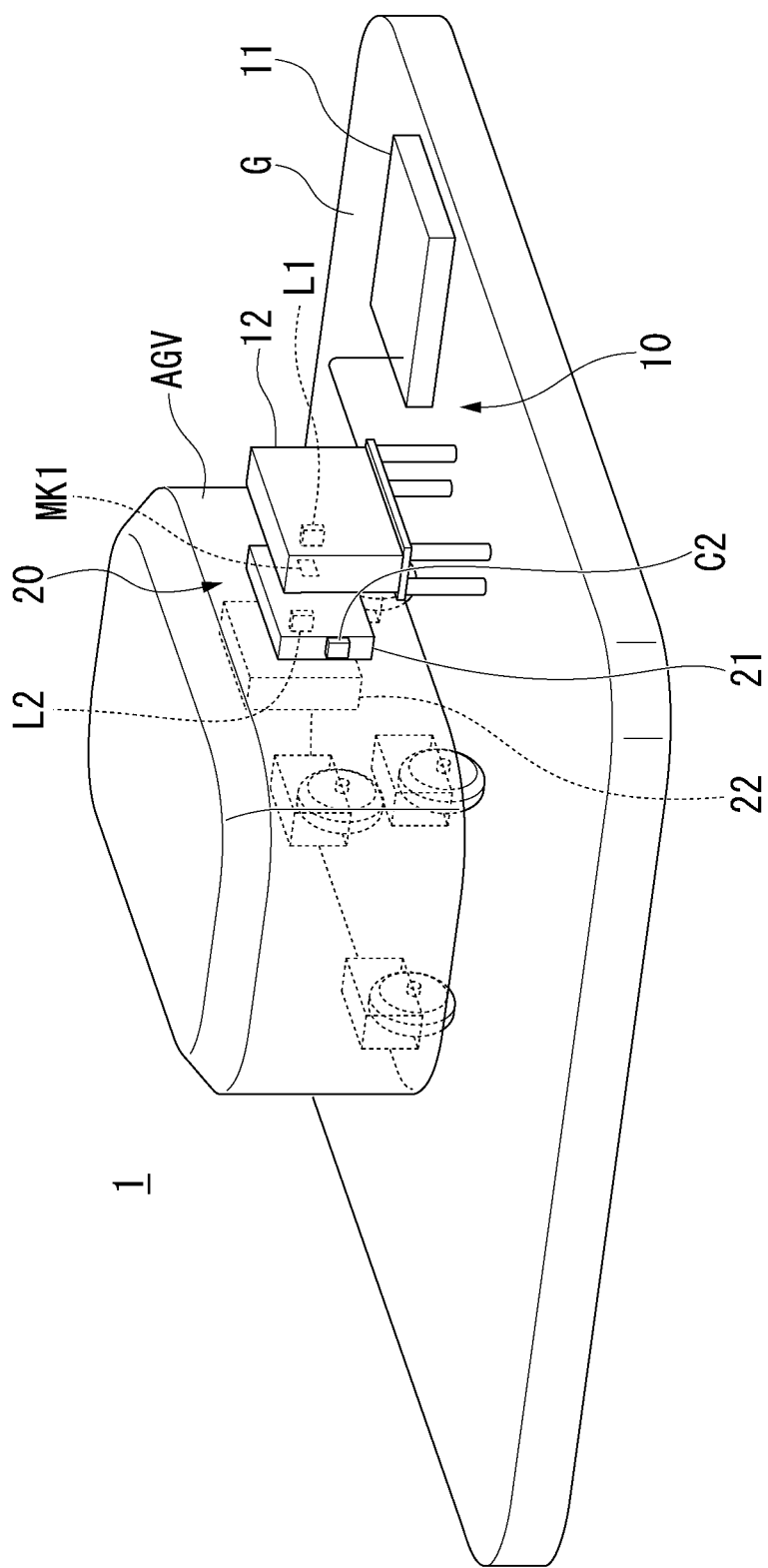
FIG. 1 is a diagram illustrating an example of the configuration of a wireless power transmission system 1.

Hereinafter, the configuration of a wireless power transmission system 1 will be described with reference to FIGS. 1 and 2. FIG. 1 is a diagram illustrating an example of the configuration of the wireless power transmission system 1.

Figure 2:
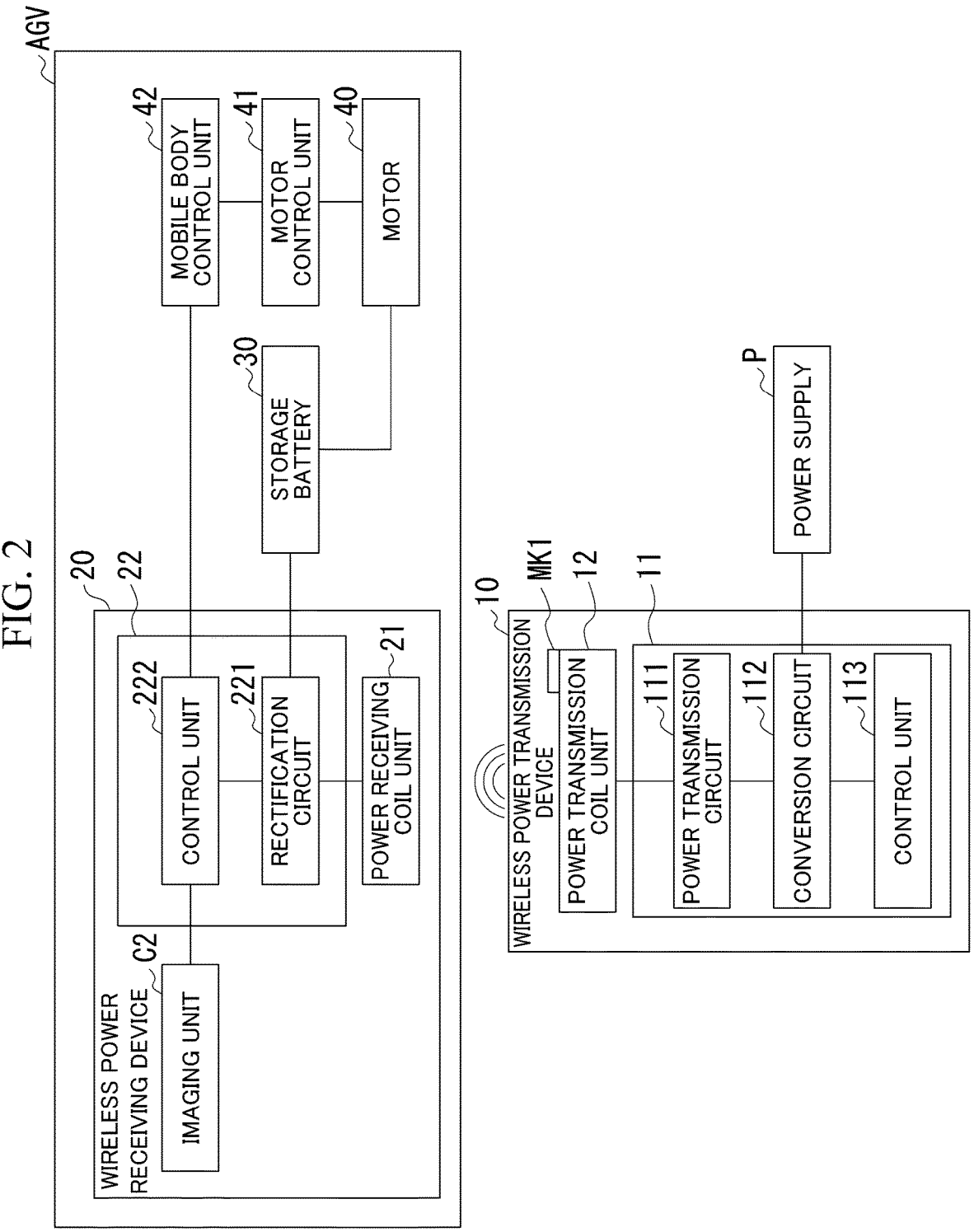
FIG. 2 is a diagram illustrating an example of configurations of a wireless power transmission device 10 included in the wireless power transmission system 1 and a wireless power receiving device 20 included in the wireless power transmission system 1.

FIG. 2 is a diagram illustrating an example of configurations of a wireless power transmission device 10 included in the wireless power transmission system 1 and a wireless power receiving device 20 included in the wireless power transmission system 1.

As described above, the wireless power transmission system 1 includes the wireless power transmission device 10 and the wireless power receiving device 20.

The wireless power transmission device 10 includes a power transmission unit 11 and a power transmission coil unit 12. The power transmission unit 11 includes a power transmission circuit 111, a conversion circuit 112, and a control unit 113. On the other hand, the wireless power receiving device 20 includes a power receiving coil unit 21, a power receiving unit 22, and an imaging unit C2. The power receiving unit 22 includes a rectification circuit 221 and a control unit 222. The wireless power receiving device 20 can be connected to a load. The load is a resistive load of which an equivalent resistance value changes with time in accordance with a demand state (a storage state or a consumption state) of electric power. In the example illustrated in FIGS. 1 and 2, the wireless power receiving device 20 is connected to a storage battery 30 that is mounted in a mobile body as such a load.

The mobile body, for example, is an AGV (Automated Guided Vehicle). The mobile body, for example, includes a storage battery 30, a motor 40, a motor control unit 41, and a mobile body control unit 42. In FIG. 1, in order to simplify the drawing, the storage battery 30, the motor 40, the motor control unit 41, and the mobile body control unit 42 are omitted.

The motor control unit 41, for example, is a circuit that drives the motor 40 in accordance with control from the mobile body control unit 42. The motor control unit 41 may be any circuit as long as it is a circuit that can drive the motor 40 in accordance with the control.

The mobile body control unit 42, for example, is a processor such as a CPU (Central Processing Unit) or a FPGA (Field Programmable Gate Array). The mobile body control unit 42 controls the motor control unit 41 based on an operation program stored in advance, thereby causing the motor control unit 41 to drive the motor 40. In accordance with this, the mobile body control unit 42 can move a mobile body along a path according to the operation program.

The mobile body may be another device controlled using electricity instead of the AGV. The wireless power receiving device 20 may be configured to be connected to the motor 40 mounted in the mobile body instead of the storage battery 30 or may be configured to be connected to another load. In addition, the wireless power receiving device 20 may be configured to include a load.

The power transmission circuit 111 is a circuit that converts a DC (Direct Current) voltage supplied from the conversion circuit 112 into an AC (Alternating Current) voltage. For example, the power transmission circuit 111 includes an inverter composed of a switching circuit in which a plurality of switching elements are connected for a bridge connection. The power transmission circuit 111 is connected to the power transmission coil unit 12. The power transmission circuit 111 supplies an AC voltage of which a drive frequency is controlled based on a resonant frequency of a transmission-side resonant circuit included in the power transmission coil unit 12 to the power transmission coil unit 12.

The conversion circuit 112 is, for example, an AC/DC converter that is connected to an external power supply P and converts an AC voltage input from the power supply P into a desired DC voltage. The power supply P is, for example, a commercial power supply but is not limited thereto. The conversion circuit 112 is connected to the power transmission circuit 111. The conversion circuit 112 supplies a DC voltage into which the AC voltage is converted to the power transmission circuit 111.

The conversion circuit 112 may be any circuit as long as it is a circuit that can supply a DC voltage to the power transmission circuit 111. For example, the conversion circuit 112 may be a conversion circuit acquired by combining a rectification smoothing circuit that converts an AC voltage into a DC voltage through rectification and a PFC (Power Factor Correction) circuit that performs power factor improvement, may be a conversion circuit acquired by combining the rectification smoothing circuit and a switching circuit such as a switching converter, or may be any other conversion circuit that outputs a DC voltage to the power transmission circuit 111.

The control unit 113 controls the entire wireless power transmission device 10. For example, the control unit 113 is a processor such as a CPU, an FPGA, or the like. The control unit 113 controls transmission of electric power from the wireless power transmission device 10 to the wireless power receiving device 20 though wireless power transmission.

The power transmission coil unit 12 includes a power transmission coil L1. The power transmission coil L1 is a coil that functions as an antenna for wireless power transmission. In other words, the power transmission coil L1 generates an AC magnetic field in accordance with an AC voltage supplied from the power transmission circuit 111 of the power transmission unit 11. In accordance with this, the power transmission coil unit 12 transmits AC power to the wireless power receiving device 20 through wireless power transmission via the power transmission coil L1. In FIG. 1, for simplification of the drawing, the power transmission coil L1 is drawn as an object having a rectangular parallelepiped shape. In FIG. 2, for simplification of the drawing, the power transmission coil L1 is omitted.

The power transmission coil unit 12 includes a capacitor that is not illustrated. The capacitor configures a transmission-side resonant circuit together with the power transmission coil L1 in the power transmission coil unit 12.

In addition, the power transmission coil unit 12 includes a magnetic body M1 that is not illustrated. The magnetic body M1 is an object that improves magnetic coupling between the power transmission coil L1 and the power receiving coil L2 to be described below. In addition, in the magnetic body M1, the power transmission coil L1 is disposed through an insulator that is not illustrated. For example, the insulator may be air, may be a member having an insulating property other than air, or may be a combination of air and the member.

In addition, the power transmission coil unit 12 may be configured to include another object for improving magnetic coupling between the power transmission coil L1 and the power receiving coil L2 in addition to the magnetic body M1.

Furthermore, the power transmission coil unit 12 may be configured to include an electromagnetic shielding body or may be configured not to include the electromagnetic shielding body. Here, the electromagnetic shielding body is an object that suppresses leakage of a magnetic field generated by the power transmission coil L1 to the outside. For example, the electromagnetic shielding body is a metal plate or the like.

Here, for example, a conductor wound as the power transmission coil L1 is a litz wire. A litz wire is a conductive wire formed from copper, aluminum, or the like. A conductor wound as the power transmission coil L1 may be a conductive wire composed using another material instead of the litz wire. Hereinafter, for the convenience of description, the conductor wound as the power transmission coil L1 will be described as a first conductor. For example, the power transmission coil L1 is a coil made of the first conductor winding spirally around a virtual axis A1, in other words, a spiral coil. In addition, the power transmission coil L1 may be a coil made of the first conductor winding helically around the axis A1, that is, a solenoid coil or may be a coil made of the first conductor winding in another shape around the axis A1. Here, the axis A1 is a virtual axis that is defined with respect to the first conductor. For this reason, an axial direction of the axis A1 with respect to a casing of the power transmission coil unit 12 changes in accordance with the shape of the power transmission coil L1. For example, the axial direction of the axis A1 with respect to the casing of the power transmission coil unit 12 in a case in which the power transmission coil L1 is a spiral coil and the axial direction of the axis A1 with respect to the casing of the power transmission coil unit 12 in a case in which the power transmission coil L1 is a solenoid coil are different directions. The axis A1 is one example of a second axis.

In a case in which electric power is transmitted to the power receiving coil unit 21 through wireless power transmission, the power transmission coil L1 is installed to face the power receiving coil unit 21. In the example illustrated in FIG. 1, the power transmission coil L1 is installed on the ground surface G such that it faces a face on which the power receiving coil unit 21 is mounted out of faces of the mobile body in that case. In the example, the power transmission coil unit 12 including the power transmission coil L1 is installed on the ground surface G together with the power transmission unit 11. In the example, the power transmission unit 11 and the power transmission coil unit 12 are separate bodies. However, the power transmission unit 11 and the power transmission coil unit 12 may be integrally configured.

Here, a marker MK1 is disposed at a predetermined first position on an external surface of the wireless power transmission device 10.

The marker MK1 is a marker to be focused on by the imaging unit C2 connected to the wireless power receiving device 20 using an auto-focus function. For example, the marker MK1 is a picture attached to a first position on the outer surface of the wireless power transmission device 10. In this case, for example, the picture is a code acquired by encoding various kinds of information such as a QR code (a registered trademark) or a barcode (in other words, a one-dimensional code or a two-dimensional code), a imaging picture (photograph) acquired by imaging a landscape, a person, or the like, but is not limited to these. In addition, the marker MK1, for example, is a part of the outer surface of the wireless power transmission device 10. In other words, the marker MK1, for example, is a part of the outer surface of the wireless power transmission device 10 that is located at the first position. In this case, for example, the part is a protrusion, a face, a depression or protrusion, or the like of the outer surface of the wireless power transmission device 10, but is not limited thereto. In addition, for example, the marker MK1 is a picture displayed on a display unit that is located at the first position on the outer surface of the wireless power transmission device 10. In this case, for example, the picture may be any picture. In addition, in this case, the wireless power transmission device 10 includes the display unit located at the first position. This display unit is a display device that includes a liquid crystal display panel or the like. This display unit is one example of a power transmission-side display unit. In addition, for example, the marker MK1 is a picture or the like that is projected to the first position on the outer surface of the wireless power transmission device 10. In this case, the picture may be any picture. In addition, in this case, the wireless power transmission device 10 includes an projection unit (for example, a projector or the like) that projects the picture at the first position. The marker MK1 may be configured to be disposed on an outer surface of the power transmission coil unit 12 that is on the outer surface of the wireless power transmission device 10. In this case, the first position is a position on the outer surface.

The predetermined first position on the outer surface of the wireless power transmission device 10 may be any position as long as it is a position located at the center of the angle of view of the imaging unit C2 among positions on the outer surface of the wireless power transmission device 10 in a case in which relative positions and postures of the power transmission coil L1 and the power receiving coil L2 are positions and postures at which the power transmission coil L1 and the power receiving coil L2 face each other. In other words, the first position may be any position as long as it is a position located at the center of the angle of view of the imaging unit C2 among positions on the outer surface of the wireless power transmission device 10 in a state in which the power transmission coil L1 and the power receiving coil L2 face each other. For this reason, in this case, the marker MK1 on a imaging picture imaged by the imaging unit C2 is located at a position among positions on the imaging picture that overlaps the center of the imaging picture. The first position may be determined in accordance with a position at which the imaging unit C2 is disposed in the wireless power receiving device 20 or may be determined earlier than a position at which the imaging unit C2 is disposed in the wireless power receiving device 20. In a case in which the first position is determined earlier than a position at which the imaging unit C2 is disposed in the wireless power receiving device 20, a position at which the imaging unit C2 is disposed in the wireless power receiving device 20 may be determined in accordance with the first position. In the example illustrated in FIG. 1, the first position is a position located between the wireless power transmission device 10 and the wireless power receiving device 20 among positions on the outer surface of the wireless power transmission device 10 in a case in which wireless power transmission is performed between the wireless power transmission device 10 and the wireless power receiving device 20.

The power receiving coil unit 21 includes the power receiving coil L2 described above. The power receiving coil L2 is a coil that functions as an antenna for wireless power transmission. In other words, the power receiving coil unit 21 receives AC power from the wireless power transmission device 10 through wireless power transmission via the power receiving coil L2. In FIG. 1, for simplification, the power receiving coil L2 is drawn as an object having a rectangular parallelepiped shape. In FIG. 2, for simplification of the drawing, the power receiving coil L2 is omitted.

In addition, the power receiving coil unit 21 includes a capacitor that is not illustrated. The capacitor configures a receiving-side resonant circuit together with the power receiving coil L2 in the power receiving coil unit 21.

In addition, the power receiving coil unit 21 includes a magnetic body M2 that is not illustrated. The magnetic body M2 is an object that improves magnetic coupling between the power receiving coil L2 and the power transmission coil L1. In addition, in the magnetic body M2, the power receiving coil L2 is disposed through an insulator that is not illustrated. For example, the insulator may be air, may be a member having an insulating property other than air, or may be a combination of air and the member.

In addition, the power receiving coil unit 21 may be configured to include another object for improving magnetic coupling between the power receiving coil L2 and the power transmission coil L1 in addition to the magnetic body M2.

Furthermore, the power receiving coil unit 21 may be configured to include an electromagnetic shielding body or may be configured not to include the electromagnetic shielding body. Here, the electromagnetic shielding body is an object that suppresses leakage of a magnetic field generated by the power receiving coil L2 to the outside. For example, the electromagnetic shielding body is a metal plate or the like.

For example, a conductor wound as the power receiving coil L2 is a litz wire. In addition, a conductor wound as the power receiving coil L2 may be a conductive wire composed using another material instead of the litz wire. Hereinafter, for the convenience of description, the conductor wound as the power receiving coil L2 will be described as a second conductor. For example, the power receiving coil L2 is a coil made of the second conductor winding spirally around a virtual axis A2, in other words, a spiral coil. In addition, the power receiving coil L2 may be a coil made of the second conductor winding helically around the axis A2, that is, a solenoid coil or may be a coil made of the second conductor in another shape around the axis A2. Here, the axis A2 is a virtual axis that is defined with respect to the second conductor. For this reason, an axial direction of the axis A2 with respect to a casing of the power receiving coil unit 21 changes in accordance with the shape of the power receiving coil L2. For example, the axial direction of the axis A2 with respect to the casing of the power receiving coil unit 21 in a case in which the power receiving coil L2 is a spiral coil and the axial direction of the axis A2 with respect to the casing of the power receiving coil unit 21 in a case in which the power receiving coil L2 is a solenoid coil are different directions. The axis A2 is one example of a first axis.

In a case in which electric power is received from the power transmission coil unit 12 through wireless power transmission, the power receiving coil L2 is installed to face the power transmission coil unit 12. In the example illustrated in FIG. 1, the power receiving coil L2 is installed on a side face of the mobile body such that it faces the power transmission coil L1 of the power transmission coil unit 12 installed on the ground surface G in the case. In the example, the power receiving coil unit 21 including the power receiving coil L2 is installed on the side face of the mobile body together with the power receiving unit 22. In the example, the power receiving coil unit 21 and the power receiving unit 22 are separate bodies. However, the power receiving coil unit 21 and the power receiving unit 22 may be integrally configured. The power receiving coil unit 21 may be configured to be installed on a bottom face of the mobile body.

The rectification circuit 221 is connected to the power receiving coil unit 21 and converts an AC voltage supplied from the power receiving coil L2 into a DC voltage through rectification. The rectification circuit 221 can be connected to a load. In the example illustrated in FIGS. 1 and 2, the rectification circuit 221 is connected to the storage battery 30. In a case in which the rectification circuit 221 is connected to a load, the rectification circuit 221 supplies the converted DC voltage to the load. In the example, the rectification circuit 221 supplies the converted DC voltage to the storage battery 30.

The control unit 222 controls the entire wireless power receiving device 20. For example, the control unit 222 is a processor such as a CPU, an FPGA, or the like. For example, the control unit 222 controls supply of a DC voltage from the rectification circuit 221 to a load.

The imaging unit C2 is connected to the control unit 222. The control unit 222 causes the imaging unit C2 to image a range that can be imaged by the imaging unit C2. The control unit 222 acquires a imaging picture imaged by the imaging unit C2 from the imaging unit C2. In a case in which a marker MK1 located at a first position on the outer surface of the wireless power transmission device 10 is imaged by the imaging unit C2, the control unit 222 outputs information including relative distance information representing a relative distance that is a relative distance of the power receiving coil L2 with respect to the power transmission coil L1 based on a detection distance detected through an auto-focus function used in the imaging of the marker MK1 by the imaging unit C2. In accordance with this, the wireless power receiving device 20 can easily cause the relative distance of the power receiving coil L2 with respect to the power transmission coil L1 to coincide with a desired distance. For example, the control unit 222 outputs the information to the mobile body control unit 42 described above. In accordance with this, the mobile body control unit 42 can move a mobile body such that a relative distance represented by the relative distance information included in the information coincides with a predetermined distance. As a result, the wireless power receiving device 20 can easily cause the relative distance of the power receiving coil L2 with respect to the power transmission coil L1 to coincide with the desired distance. In an embodiment, a case in which the information is three-dimensional relative position posture information will be described as an example. The three-dimensional relative position posture information is information that includes relative position information representing a relative position of the power receiving coil L2 with respect to the power transmission coil L1 as a relative position and relative posture information representing a relative posture of the power receiving coil L2 with respect to the power transmission coil L1 as a relative posture together with relative distance information. The three-dimensional relative position posture information may be replaced with three-dimensional relative position information. The three-dimensional relative position information is information that includes relative position information together with relative distance information. Furthermore, the three-dimensional relative position posture information may be replaced with three-dimensional relative posture information. The three-dimensional relative posture information is information that includes relative posture information together with relative distance information.

Here, a relative position is a relative position of the origin point of a virtual three-dimensional coordinate system X2 associated with the power receiving coil L2 with respect to the origin point of a virtual three-dimensional coordinate system X1 associated with the power transmission coil L1. The three-dimensional coordinate system X1 is a three-dimensional coordinate system associated with the power transmission coil L1 such that a reference position determined in accordance with the power transmission coil L1 and the position of the origin point of the three-dimensional coordinate system X1 coincide with each other. For this reason, the three-dimensional coordinate system X1 is a three-dimensional coordinate system that moves together with the power transmission coil L1. Although the reference position determined in accordance with the power transmission coil L1 is, for example, the position of a center of gravity of the power transmission coil L1, the reference position may be another position determined in accordance with the power transmission coil L1 such as one of positions fixed not to be relatively movable with respect to the power transmission coil L1 among positions on the outer surface of the wireless power transmission device 10. The three-dimensional coordinate system X2 is a three-dimensional coordinate system associated with the power receiving coil L2 such that a reference position determined in accordance with the power receiving coil L2 and the position of the origin point of the three-dimensional coordinate system X2 coincide with each other. For this reason, the three-dimensional coordinate system X2 is a three-dimensional coordinate system that moves together with the power receiving coil L2. Although the reference position determined in accordance with the power receiving coil L2 is, for example, the position of a center of gravity of the power receiving coil L2, the reference position may be another position determined in accordance with the power receiving coil L2 such as one position fixed not to be relatively movable with respect to the power receiving coil L2 among positions on the outer surface of the wireless power receiving device 20. Hereinafter, as an example, a case in which the three-dimensional coordinate system X1 and the three-dimensional coordinate system X2 are three-dimensional coordinate systems in which positive directions of Z axes are parallel in opposite directions in a case in which the wireless power transmission device 10 and the wireless power receiving device 20 perform wireless power transmission will be described. In this case, a relative position is represented using a position on an XY plane of the three-dimensional coordinate system X1 or the three-dimensional coordinate system X2.

In addition, a relative posture is a relative direction of each coordinate axis of the three-dimensional coordinate system X2 with respect to the direction of each coordinate axis of the three-dimensional coordinate system X1. Although the corresponding direction is, for example, represented using an Eulerian angle or the like, it may be represented using another method. The relative posture may be defined using another method according to the power transmission coil L1 and the power receiving coil L2.

The imaging unit C2 is a camera having an auto-focus function. For example, a system of the auto-focus function of the imaging unit C2 may be an active system, a passive system, a phase difference auto-focus (AF) system, an imaging plane phase difference AF system, or any other existing system or may be a system that is developed in the future. The imaging unit C2 may be configured to be able to image a still picture or may be configured to be able to image a moving picture. The imaging unit C2 detects a distance from the imaging unit C2 to an in-focus focal point as a detection distance using such an auto-focus function. In a case in which a imaging picture is imaged using the auto-focus function, the imaging unit C2 outputs detection distance information representing a detection distance detected in imaging of the imaging picture to the control unit 222 together with the imaged imaging picture.

The imaging unit C2 is disposed in the wireless power receiving device 20 such that the first position described above is located at the center of the angle of view in a case in which the relative position and the relative posture are a relative position and a relative posture at which the power transmission coil L1 and the power receiving coil L2 face each other.

<Process of Wireless Power Receiving Device Starting Receiving of Electric Power Through Wireless Power Transmission>

Figure 3:
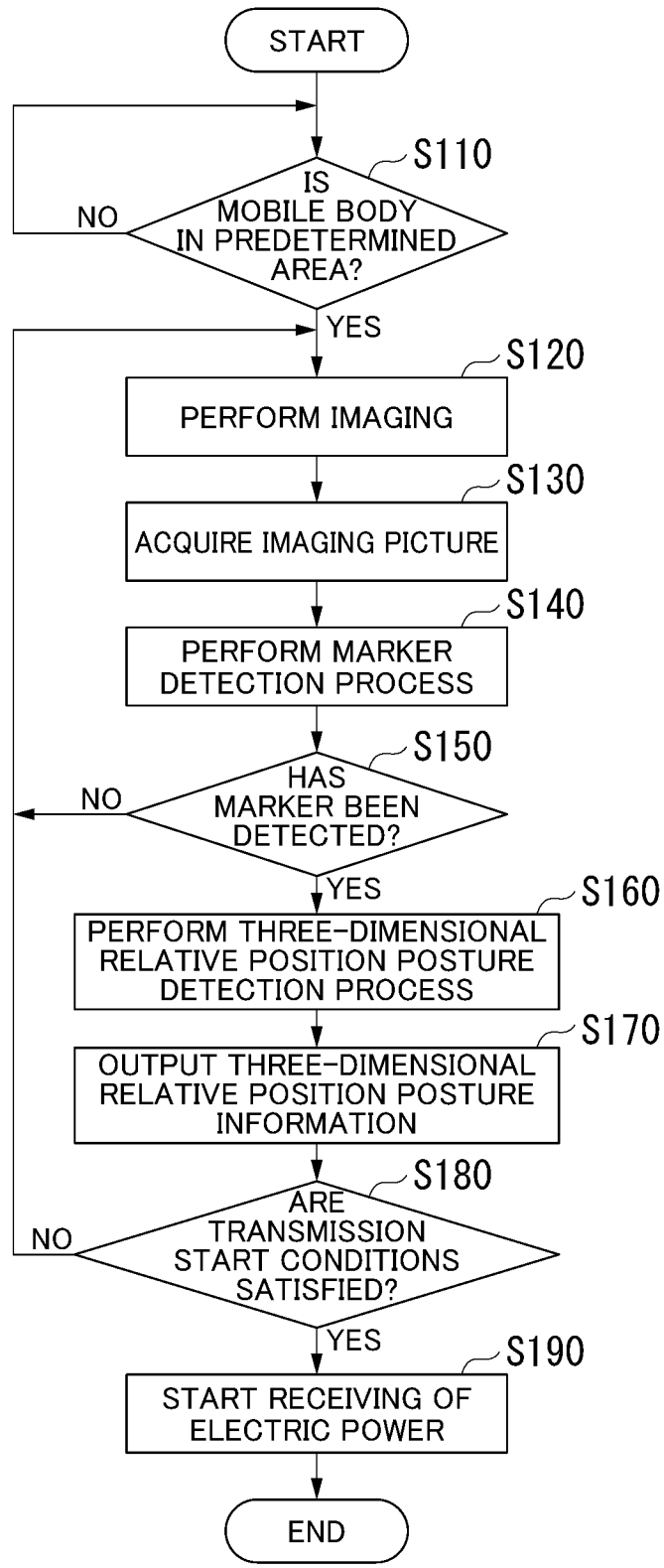
FIG. 3 is a diagram illustrating an example of the flow of a process of the wireless power receiving device 20 starting receiving of electric power through wireless power transmission.

Hereinafter, the process of the wireless power receiving device 20 starting receiving of electric power through wireless power transmission will be described with reference to FIG. 3. FIG. 3 is a diagram illustrating an example of the flow of the process of the wireless power receiving device 20 starting receiving of electric power through wireless power transmission. Hereinafter, as an example, a case in which a mobile body in which the wireless power receiving device 20 is mounted starts movement into a predetermined area in a predetermined direction at a timing before the process of Step S110 illustrated in FIG. 3 is performed will be described. Hereinafter, as an example, a case in which a marker MK1 disposed on the wireless power transmission device 10 enters a range that can be imaged by the imaging unit C2 when a mobile body enters the inside of a predetermined area in a predetermined direction will be described. The predetermined area is an area that is determined in advance as an area in which the wireless power receiving device 20 receives electric power from the wireless power transmission device 10 through wireless power transmission. The predetermined direction may be any direction among directions toward the predetermined area as long as movement of a mobile body in that direction can enable the wireless power receiving device 20 to perform wireless power transmission with the wireless power transmission device 10.

The control unit 222 waits until a mobile body enters the inside of the predetermined area (Step S110). A method for determining whether or not a mobile body has entered the inside of the predetermined area may be a known method or may be a method developed in the future.

In a case in which it is determined that a mobile body has entered the inside of the predetermined area (Step S10-Yes), the control unit 222 causes the imaging unit C2 to image a range that can be imaged by the imaging unit C2 (Step S120).

Next, the control unit 222 acquires a imaging picture imaged by the imaging unit C2 in Step S120 from the imaging unit C2 (Step S130). In this case, the control unit 222 acquires detection distance information representing a detection distance detected using the auto-focus function used for imaging the imaging picture by the imaging unit C2 together with the imaging picture.

Next, the control unit 222 performs a marker detection process for detecting a marker MK1 from the imaging picture based on the imaging picture acquired in Step S130 (Step S140). A method for detecting a marker MK1 from the imaging picture may be a known method or may be a method developed in the future.

Next, the control unit 222 determines whether or not the marker MK1 has been detected in the marker detection process of Step S140 (Step S150).

In a case in which it is determined that the marker MK1 has not been detected in the marker detection process (Step S50-No), the control unit 222 causes the process to proceed to Step S120 and causes the imaging unit C2 to image a range that can be imaged by the imaging unit C2 again.

On the other hand, in a case in which it is determined that the marker MK1 has been detected in the marker detection process (Step S150-Yes), the control unit 222 performs a three-dimensional relative position posture detection process as an example of the process of detecting a relative distance described above (Step S160). Here, the three-dimensional relative position posture detection process will be described.

The three-dimensional relative position posture detection process is a process of detecting a relative distance, a relative position, and a relative posture.

In the three-dimensional relative position posture detection process, the control unit 222 detects (identifies) a detection distance represented by the detection distance information acquired in Step S130 as a relative distance. The control unit 222 may be configured to detect a relative distance based on first correspondence information in which the detection distance and a relative distance are associated with each other and the detection distance. In such a case, the first correspondence information is stored in advance in the control unit 222. The first correspondence information may be generated based on results of tests, experiments, and the like performed in advance or may be generated based on a calculation result acquired using a theoretical formula.

In addition, in the three-dimensional relative position posture detection process, the control unit 222 detects a position among positions in the imaging picture acquired in Step S120 that coincides with the position of the marker MK1 detected in Step S130. Here, the position of the marker MK1 is represented using a position of a centroid of the marker MK1, a position of a center of gravity of the marker MK1, or the like. The position of the marker MK1 may be represented using another position according to the marker MK1. In addition, each position in the imaging picture is associated with a position on a virtual three-dimensional space represented by the three-dimensional coordinate system X2. For example, the control unit 222 identifies the position of the marker MK1 in the three-dimensional space as a relative position of the marker MK1 with respect to the power receiving coil L2 based on second correspondence information in which positions in the imaging picture and positions in the three-dimensional space are associated with each other. In this case, the second correspondence information is stored in the control unit 222 in advance. The second correspondence information may be generated based on results of tests, experiments, and the like performed in advance or may be generated based on a calculation result acquired using a theoretical formula. The method for identifying the position of the marker MK1 in the three-dimensional space may be another method. After identifying the position of the marker MK1 in the three-dimensional space, the control unit 222 detects (identifies) a relative position based on the identified position. In this case, for example, the control unit 222 detects a relative position based on third correspondence information in which the identified position, each position in the three-dimensional space, and a relative position are associated with each other. In this case, the third correspondence information is stored in the control unit 222 in advance. The third correspondence information may be generated based on results of tests, experiments, and the like performed in advance or may be generated based on a calculation result acquired using a theoretical formula.

Figure 4:
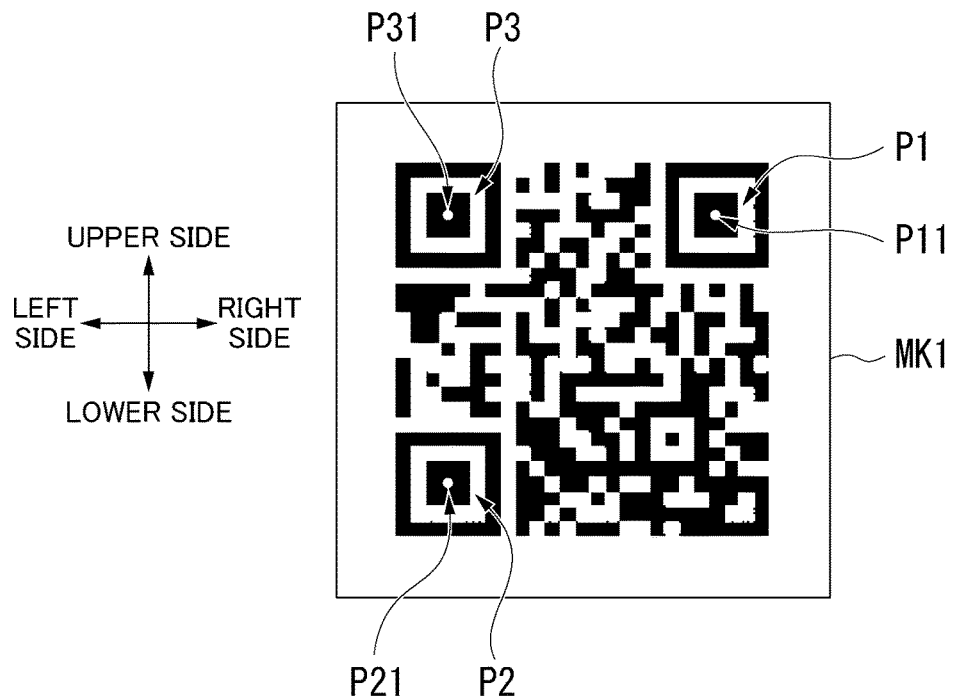
FIG. 4 is a diagram illustrating an example of a marker MK1 in the case in which it is a QR code.

In addition, in the three-dimensional relative position posture detection process, the control unit 222 detects a relative posture based on the marker MK1 detected in Step S130. Her, the marker MK1 will be described in detail. The marker MK1 includes a first part P1 representing a first feature point, a second part P2 representing a second feature point, and a third part P3 representing a third feature point. The second feature point is separated from the first feature point. For this reason, the second part P2 is separated from the first part P1. In addition, the third feature point is separated from a line segment connecting the first feature point and the second feature point. For this reason, the third part P3 is separated from each of the first part P1 and the second part P2. Each of three feature points including the first feature point to the third feature point may be any point as long as it is a point that can be detected by the control unit 222. For example, in a case in which the marker MK1 is a QR code, segmentation symbols included in the QR code can be employed as the first part P1 to the third part P3. FIG. 4 is a diagram illustrating an example of the marker MK1 in the case in which it is a QR code. Arrows illustrated in FIG. 4 represent upper, lower, left, and right sides in FIG. 4. In the example illustrated in FIG. 4, a segmentation symbol disposed on the upper right side is an example of the first part P1. In the example, a segmentation symbol disposed on the lower left side is an example of the second part P2. In addition, in the example, a segmentation symbol disposed on the upper left side is an example of the third part P3. In the example, the first part P1 represents a point that represents a centroid of the first part P1 as a first feature point P11. In addition, in the example, the second part P2 represents a point that represents a centroid of the second part P2 as a second feature point P21. In the example, the third part P3 represents a point that represents a centroid of the third part P3 as a third feature point P31. As illustrated in FIG. 4, the second feature point P21 is separated from the first feature point P11. In addition, the third feature point P31 is separated from a line segment connecting the first feature point P11 and the second feature point P21.

Also in the case in which the marker MK1 is not a QR code, parts corresponding to the first part P1 to the third part P3 are disposed in the marker MK1. For example, also in a case in which the marker MK1 is a barcode, the first part P1 to the third part P3 are disposed in the marker MK1. In addition, for example, also in a case in which the marker MK1 is a landscape photograph, the first part P1 to the third part P3 are disposed in the marker MK1.

For example, in the three-dimensional relative position posture detection process, the control unit 222 detects the positions of three feature points including a first feature point P11, a second feature point P21, and a third feature point P31 based on the imaging picture acquired in Step S120. Then, the control unit 222 detects a distance from the imaging unit C2 to a feature point for each of these three feature points that have been detected using the auto-focus function of the imaging unit C2 by controlling the imaging unit C2. Hereinafter, for the convenience of description, a distance from the imaging unit C2 to the first feature point P11 will be described as a first distance, a distance from the imaging unit C2 to the second feature point P21 will be described as a second distance, and a distance from the imaging unit C2 to the third feature point P31 will be described to as a third distance. The control unit 222 detects a relative posture based on three distances including the first distance, the second distance, and the third distance that have been detected. For example, the control unit 222 detects a relative posture based on fourth correspondence information in which a combination of these three distances and a relative posture am associated with each other and the combination of the three distances. In this case, the fourth correspondence information is stored in the control unit 222 in advance. The fourth correspondence information may be generated based on results of tests, experiments, and the like performed in advance or may be generated based on a calculation result acquired using a theoretical formula. The control unit 222 may be configured to determine that the relative posture is a predetermined posture in a case in which these three distances are the same and determine that the relative posture is not the predetermined posture in a case in which some or all of these three distances are different. In such a case, the control unit 222 detects a relative posture coinciding with the predetermined posture as a relative posture Y1 and detects a relative posture not coinciding with the predetermined posture as a relative posture Y2. The predetermined posture will be described below.

In this way, the control unit 222 performs the three-dimensional relative position posture detection process in Step S160, thereby detecting a relative distance, a relative position, and a relative posture.

In addition, the marker MK1 may be configured to include the first part P1 and the second part P2 and not to include the third part P3. In this case, in the three-dimensional relative position posture detection process, the control unit 222 detects positions of two feature points including the first feature point P11 and the second feature point P21 based on the imaging picture acquired in Step S120. Then, the control unit 222 detects a first distance and a second distance using the auto-focus function of the imaging unit C2 by controlling the imaging unit C2. The control unit 222 detects a relative posture based on two distances including the first distance and the second distance that have been detected. For example, the control unit 222 detects a relative posture based on fifth correspondence information in which a combination of these two distances and a relative posture are associated with each other and the combination of the two distances. In this case, the fifth correspondence information is stored in the control unit 222 in advance. The fifth correspondence information may be generated based on results of tests, experiments, and the like performed in advance or may be generated based on a calculation result acquired using a theoretical formula.

In addition, the control unit 222 may be configured to perform a three-dimensional relative position detection process in place of the three-dimensional relative position posture detection process in Step S160. The three-dimensional relative position detection process is a process of detecting a relative distance and a relative position. In such a case, parts respectively corresponding to the first part P1 to the third part P3 may be configured not to be provided in the marker MK1. In addition, the control unit 222 may be configured to perform a three-dimensional relative posture detection process in place of the three-dimensional relative position posture detection process in Step S160. The configured to perform a three-dimensional relative posture detection process is a process of detecting relative distances and a relative posture. In addition, the control unit 222 may be configured to perform a relative distance detection process in place of the three-dimensional relative position posture detection process in Step S160. Also in this case, parts respectively corresponding to the first part P1 to the third part P3 may be configured not to be provided in the marker MK1. Furthermore, the control unit 222 may be configured to detect relative distances, relative positions, and a relative posture in accordance with a certain method using the auto-focus function of the imaging unit C2 among methods other than the methods described above.

After the process of Step S160 is performed, the control unit 222 generates information including relative distance information representing the relative distances detected in Step S160, relative position information representing the relative positions, and relative posture information representing the relative posture as three-dimensional relative position posture information. Then, the control unit 222 outputs the generated three-dimensional relative position posture information to the mobile body control unit 42 (Step S170).

Next, the control unit 222 determines whether or not predetermined transmission start conditions are satisfied based on the relative distances, the relative positions, and the relative posture detected in Step S160 (Step S180). He, the transmission start conditions will be described.

The transmission start conditions are conditions for starting wireless power transmission. More specifically, three conditions including a first condition to a third condition described below are included in the transmission start conditions. Satisfaction of the transmission start conditions means that all these three conditions are satisfied.

(First condition): A relative distance is included within a predetermined distance range.

(Second condition): A relative position is included within a predetermined position range.

(Third condition): A relative posture is included within a predetermined posture range.

The predetermined distance range is a range of relative distances determined in advance. The predetermined position range is a range of relative positions determined in advance. The predetermined posture range is a range of relative postures determined in advance (for example, the range of the Eulerian angle described above). Each of the predetermined distance range, the predetermined position range, and the predetermined posture range is determined such that transmission efficiency of electric power according to wireless power transmission between the wireless power transmission device 10 and the wireless power receiving device 20 becomes predetermined efficiency or more in a case in which all the three conditions described above are satisfied. Here, the central value of the predetermined position range is 0 and is a value indicating that the position of the power transmission coil L1 and the position of the power receiving coil L2 do not deviate from each other on the XY plane of the three-dimensional coordinate system X1 or the three-dimensional coordinate system X2. In addition, in a case in which the relative posture is represented using Eulerian angles, a central value of the predetermined posture range are three angles indicating that the posture of the power transmission coil L1 and the posture of the power receiving coil L2 coincide with each other, in other words, the XY plane of the three-dimensional coordinate system X1 and the XY plane of the three-dimensional coordinate system X2 are parallel with each other. The state in which the power transmission coil L1 and the power receiving coil L2 face each other described above means a state in which all the three conditions described above are satisfied, in other words, a state in which the transmission start conditions are satisfied.

In a case in which it is determined that the transmission start conditions are not satisfied (Step S180-No), the control unit 222 causes the process to proceed to Step S120 and causes the imaging unit C2 to image a range that can be imaged by the imaging unit C2 again.

On the other hand, in a case in which it is determined that the transmission start conditions are satisfied (Step S180-Yes), the control unit 222 starts receiving of electric power through wireless power transmission (Step S190) and ends the process of the flowchart illustrated in FIG. 3. The process of Step S190 may be configured to include various processes performed before start of the receiving of electric power as a preparation of the receiving of electric power or may be configured to include a process of waiting for a predetermined time before the start of the receiving of electric power.

Here, the process performed by the mobile body control unit 42 that has acquired the three-dimensional relative position posture information output in Step S170 will be described with reference to FIG. 5.

Figure 5:
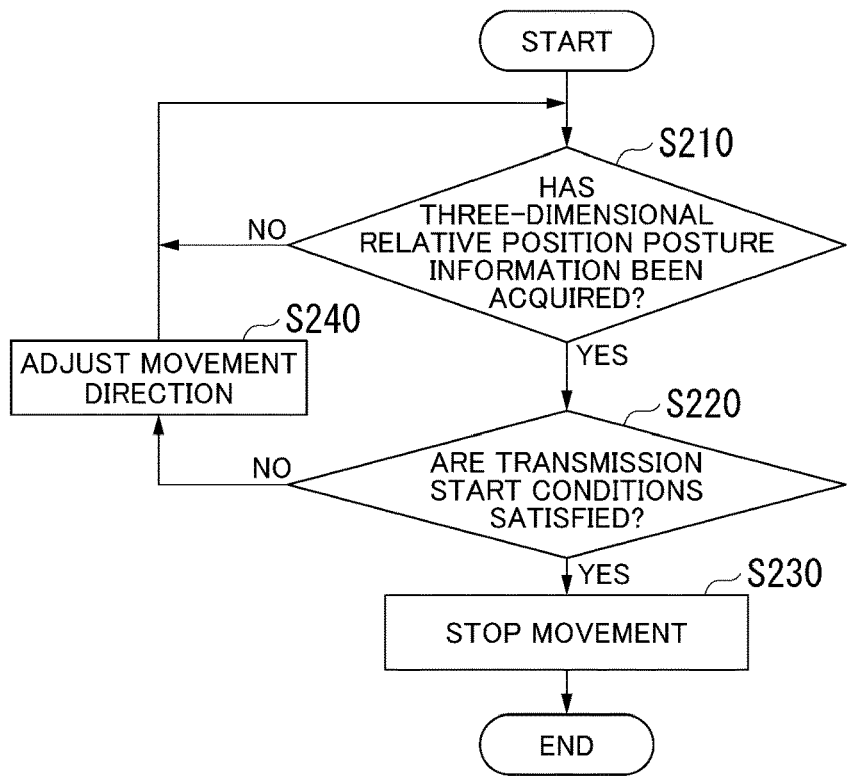
FIG. 5 is a diagram illustrating an example of the flow of a process performed by a mobile body control unit 42 of a mobile body located within a predetermined area.

FIG. 5 is a diagram illustrating an example of the flow of the process performed by the mobile body control unit 42 of a mobile body located inside a predetermined area.

The mobile body control unit 42 waits until the three-dimensional relative position posture information is acquired from the control unit 222 (Step S210).

In a case in which it is determined that the three-dimensional relative position posture information has been acquired from the control unit 222 (Step S210-Yes), the mobile body control unit 42 determines whether or not the transmission start conditions are satisfied based on the acquired three-dimensional relative position posture information (Step S220). The process of Step S220 similar to the process of Step S180, and thus description thereof will be omitted. In addition, the mobile body control unit 42 may be configured to acquire determination result information representing a result of this determination from the control unit 222. In such a case, after performing the determination of Step S180, the control unit 222 outputs the determination result information to the mobile body control unit 42. In addition, in the case, the mobile body control unit 42 determines whether or not the transmission start conditions are satisfied based on the acquired determination result information in Step S220.

In a case in which it is determined that the transmission start conditions are not satisfied (Step S220-No), the mobile body control unit 42 adjusts a movement direction of the mobile body based on the three-dimensional relative position posture information acquired in Step S210 such that a position and a posture of the mobile body coincide with a position and a posture with which the transmission start conditions are satisfied (Step S240). In other words, the mobile body adjusts at least one of the relative distance, the relative position, and the relative posture based on the three-dimensional relative position posture information output from the wireless power receiving device 20 in the case. After performing the process of Step S240, the mobile body control unit 42 causes the process to proceed to Step S210 and waits again until the three-dimensional relative position posture information is acquired from the control unit 222.

On the other hand, in a case in which it is determined that the transmission start conditions are satisfied (Step S220-Yes), the mobile body control unit 42 stops the movement of the mobile body (Step S230) and ends the process of the flowchart illustrated in FIG. 5.

As described above, the wireless power receiving device 20 causes the imaging unit C2 to image a range that can be imaged by the imaging unit C2 and, in a case in which a marker MK1 located at the predetermined first position on the outer surface of the wireless power transmission device 10 is imaged by the imaging unit C2, outputs relative distance information representing a relative distance based on a detection distance detected using the auto-focus function used for imaging the marker MK1 by the imaging unit C2. In accordance with this, the mobile body can adjust the relative distance based on the relative distance information output from the wireless power receiving device 20. As a result, the wireless power receiving device 20 can easily cause the relative distance to coincide with a desired distance. In the example described above, the wireless power receiving device 20 can easily cause the relative distance to coincide with a desired distance and can easily cause the relative posture to coincide with a desired posture by causing the relative position to coincide with the desired position.

In addition, in the embodiment, the wireless power transmission device 10 detects satisfaction of the transmission start conditions using a certain method and starts transmission of electric power to the wireless power receiving device 20 through wireless power transmission. A method for detecting satisfaction of the transmission start conditions may be a known method or may be a method developed in the future. For example, as will be described in modified examples of the embodiment described below, the wireless power transmission device 10 may be configured to communicate with the wireless power receiving device 20 and detect (identify) satisfaction of the transmission start conditions using the communication. In addition, the wireless power transmission device 10 may be configured to detect satisfaction of the transmission start conditions in accordance with an output from a sensor that detects coincidence of the location of the mobile body with a predetermined charging location. The predetermined charging location is a location for which the transmission start conditions are satisfied by causing the location of the mobile body to coincide therewith. The sensor may be a contact sensor or any other sensor that can detect the location of the mobile body.

In addition, in a case in which a code in which various kinds of information is encoded like a QR code is the marker MK1, power transmission device identification information for identifying the wireless power transmission device 10 may be configured to be encoded in the marker MK1. In such a case, in a case in which the marker MK1 is imaged by the imaging unit C2, the control unit 222 outputs the power transmission device identification information to the mobile body control unit 42 based on the imaging picture imaged by the imaging unit C2. In accordance with this, the mobile body can perform a process based on the power transmission device identification information acquired from the wireless power transmission device 10. For example, in a case in which the mobile body enters an area in which a wireless power transmission device 10 different from the wireless power transmission device 10 for which a setting determined in advance is performed among a plurality of wireless power transmission devices 10 is included, the mobile body control unit 42 can move the mobile body to the outside of the area before the wireless power receiving device 20 receives electric power from the corresponding wireless power transmission device 10. This process based on the power transmission device identification information may be another process in place of the movement of such a mobile body. Here, the code may be a one-dimensional code or may be a two-dimensional code.

Modified Example 1 of Embodiment

Figure 6:
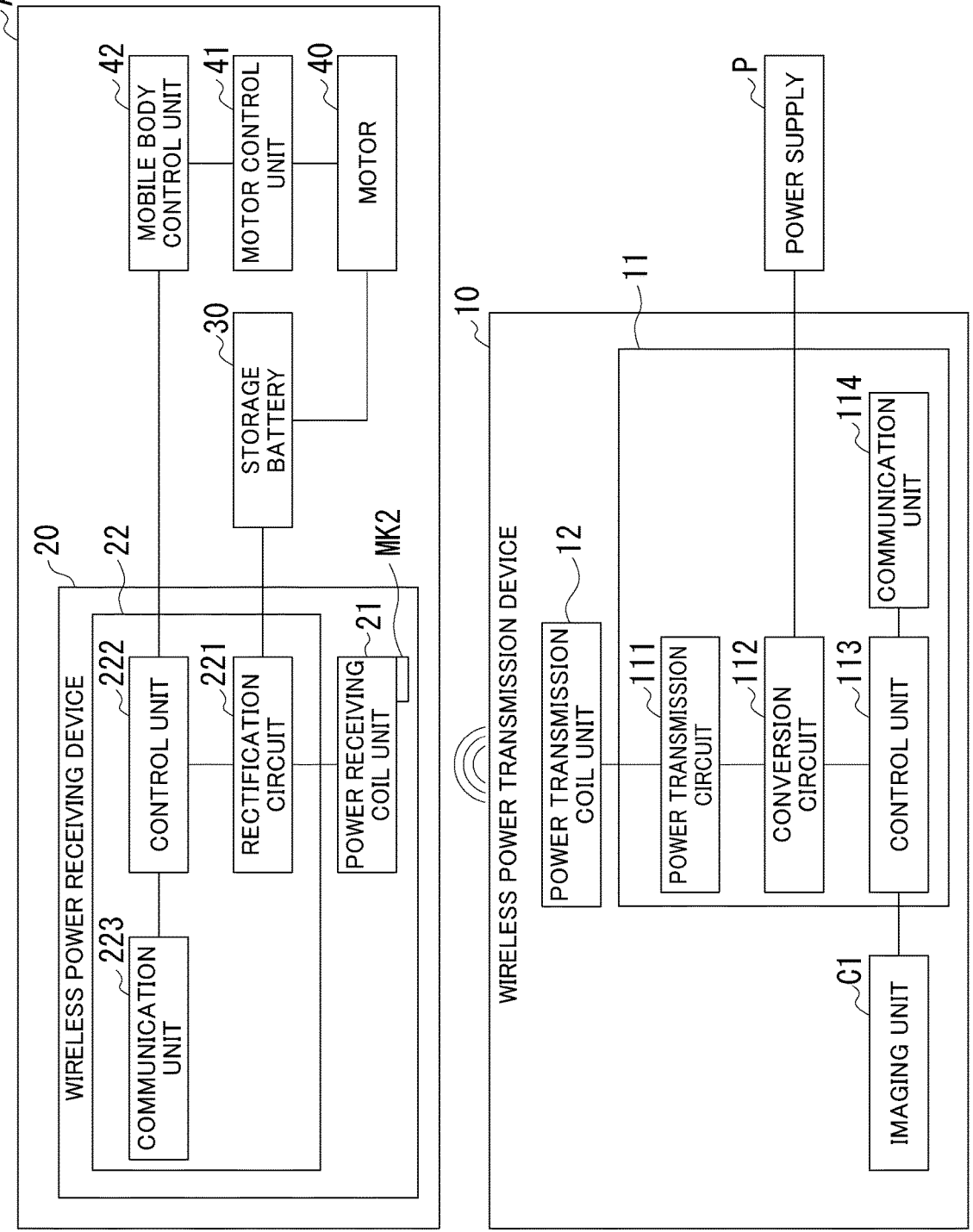
FIG. 6 is a diagram illustrating another example of configurations of a wireless power transmission device 10 included in a wireless power transmission system 1 and a wireless power receiving device 20 included in the wireless power transmission system 1.

Hereinafter, Modified example 1 of the embodiment will be described. In Modified example 1 of the embodiment, the same reference numerals will be assigned to the same components as those according to the embodiment, and description thereof will be omitted. FIG. 6 is a diagram illustrating another example of configurations of a wireless power transmission device 10 included in a wireless power transmission system 1 and a wireless power receiving device 20 included in the wireless power transmission system 1.

In Modified example 1 of the embodiment, the wireless power receiving device 20 does not include the imaging unit C2, and the wireless power transmission device 10 includes an imaging unit C1. In addition, in Modified example 1 of the embodiment, the marker MK1 is not disposed in the wireless power transmission device 10, and a marker MK2 is disposed at a predetermined second position on the outer surface of the wireless power receiving device 20. In this case, the power transmission unit 11 of the wireless power transmission device 10 includes a communication unit 114 in addition to the power transmission circuit 111, the conversion circuit 112, and the control unit 113. In addition, in the case, the power receiving unit 22 of the wireless power receiving device 20 includes a communication unit 223 in addition to the rectification circuit 221 and the control unit 222.

The communication unit 114, for example, is a communication circuit (or a communication device) that performs transmission/receiving of signals using radio communication, optical communication, electromagnetic induction, sounds, vibrations, or the like. The communication unit 114 communicates with the communication unit 223 of the wireless power receiving device 20.

The imaging unit C1 is a camera having an auto-focus function. For example, a system of the auto-focus function of the imaging unit C1 may be an active system, a passive system, a phase difference auto-focus (AF) system, an imaging plane phase difference AF system, or any other existing system or may be a system that is developed in the future. The imaging unit C1 may be configured to be able to image a still picture or may be configured to be able to image a moving picture. The imaging unit C1 detects a distance from the imaging unit C1 to an in-focus focal point as a detection distance using such an auto-focus function. In a case in which a imaging picture is imaged using the auto-focus function, the imaging unit C1 outputs detection distance information representing a detection distance detected in imaging of a imaging picture to the control unit 113 together with the imaged imaging picture.

The imaging unit C1 is disposed in the wireless power transmission device 10 such that the second position described above is located at the center of the angle of view in a case in which the relative position and the relative posture are a relative position and a relative posture at which the power transmission coil L1 and the power receiving coil L2 face each other.

The marker MK2 is a mark on which the imaging unit C1 connected to the wireless power transmission device 10 focuses using the auto-focus function. For example, the marker MK2 is a picture that is attached to a second position on the outer surface of the wireless power receiving device 20. In this case, for example, the picture is a code acquired by encoding various kinds of information such as a QR code or a barcode (in other words, a one-dimensional code or a two-dimensional code), a imaging picture (photograph) acquired by imaging a landscape, a person, or the like and is not limited to these. In addition, the marker MK2, for example, is a part of the outer surface of the wireless power receiving device 20. In other words, the marker MK2, for example, is a par of the outer surface of the wireless power receiving device 20 that is located at the second position. In this case, for example, the part is a protrusion, a face, a depression or protrusion, or the like of the outer surface of the wireless power receiving device 20, but is not limited thereto. In addition, for example, the marker MK2 is a picture displayed on a display unit that is located at the second position on the outer surface of the wireless power receiving device 20. In this case, the picture may be any picture. In addition, in this case, the wireless power receiving device 20 includes the display unit located at the second position. This display unit is a display device that includes a liquid crystal display panel or the like. This display unit is one example of a power receiving-side display unit. In addition, for example, the marker MK2 is a picture or the like that is projected to the second position on the outer surface of the wireless power receiving device 20. In this case, the picture may be any picture. In addition, in this case, the wireless power receiving device 20 includes an projection unit (for example, a projector or the like) that projects the picture at the second position. The marker MK2 may be configured to be disposed on an outer surface of the power receiving coil unit 21 that is on the outer surface of the wireless power receiving device 20. In this case, the second position is a position of the outer surface.

The predetermined second position on the outer surface of the wireless power receiving device 20 may be any position as long as it is a position located at the center of the angle of view of the imaging unit C1 among positions on the outer surface of the wireless power receiving device 20 in a case in which relative positions and postures of the power transmission coil L1 and the power receiving coil L2 are positions and postures at which the power transmission coil L1 and the power receiving coil L2 face each other. In other words, the second position may be any position as long as it is a position located at the center of the angle of view of the imaging unit C1 among positions on the outer surface of the wireless power receiving device 20 in a state in which the power transmission coil L1 and the power receiving coil L2 face each other. For this reason, in the case, the marker MK2 on a imaging picture imaged by the imaging unit C1 is located at a position among positions on the imaging picture that overlaps the center of the imaging picture. The second position may be determined in accordance with a position at which the imaging unit C1 is disposed in the wireless power transmission device 10 or may be determined earlier than a position at which the imaging unit C1 is disposed in the wireless power transmission device 10. In a case in which the second position is determined earlier than a position at which the imaging unit C1 is disposed in the wireless power transmission device 10, a position at which the imaging unit C1 is disposed in the wireless power transmission device 10 may be determined in accordance with the second position. For example, the second position is a position located between the wireless power transmission device 10 and the wireless power receiving device 20 among positions on the outer surface of the wireless power receiving device 20 in a case in which wireless power transmission is performed between the wireless power transmission device 10 and the wireless power receiving device 20.

The communication unit 223, for example, is a communication circuit (or a communication device) that performs transmission/receiving of signals using radio communication, optical communication, electromagnetic induction, sounds, vibrations, or the like. The communication unit 223 communicates with the communication unit 114 of the wireless power transmission device 10.

The imaging unit C1 is connected to the control unit 113 in Modified example 1 of the embodiment. The control unit 113 causes the imaging unit C1 to image a range that can be imaged by the imaging unit C1. The control unit 113 acquires a imaging picture imaged by the imaging unit C1 from the imaging unit C1. In a case in which a marker MK2 located at a second position on the outer surface of the wireless power receiving device 20 is imaged by the imaging unit C1, the control unit 113 outputs information including relative distance information representing a relative distance based on a detection distance detected using an auto-focus function used in the imaging of the marker MK2 by the imaging unit C1. In accordance with this, the wireless power transmission device 10 can easily cause the relative distance to coincide with a desired distance. For example, the control unit 113 outputs the information to the wireless power receiving device 20. In accordance with this, the wireless power receiving device 20 can move a mobile body such that a relative distance represented by the relative distance information included in the information coincides with a predetermined distance. As a result, the wireless power transmission device 10 can easily cause the relative distance to coincide with the desired distance. In Modified example 1 of the embodiment, a case in which the information is the three-dimensional relative position posture information described above will be described as an example. Also in Modified example 1 of the embodiment, the three-dimensional relative position posture information may be replaced with three-dimensional relative position information. Furthermore, also in Modified example 1 of the embodiment, the three-dimensional relative position posture information may be replaced with three-dimensional relative posture information.

<Process of Wireless Power Transmission Device Starting Transmission of Electric Power Through Wireless Power Transmission>

Figure 7:
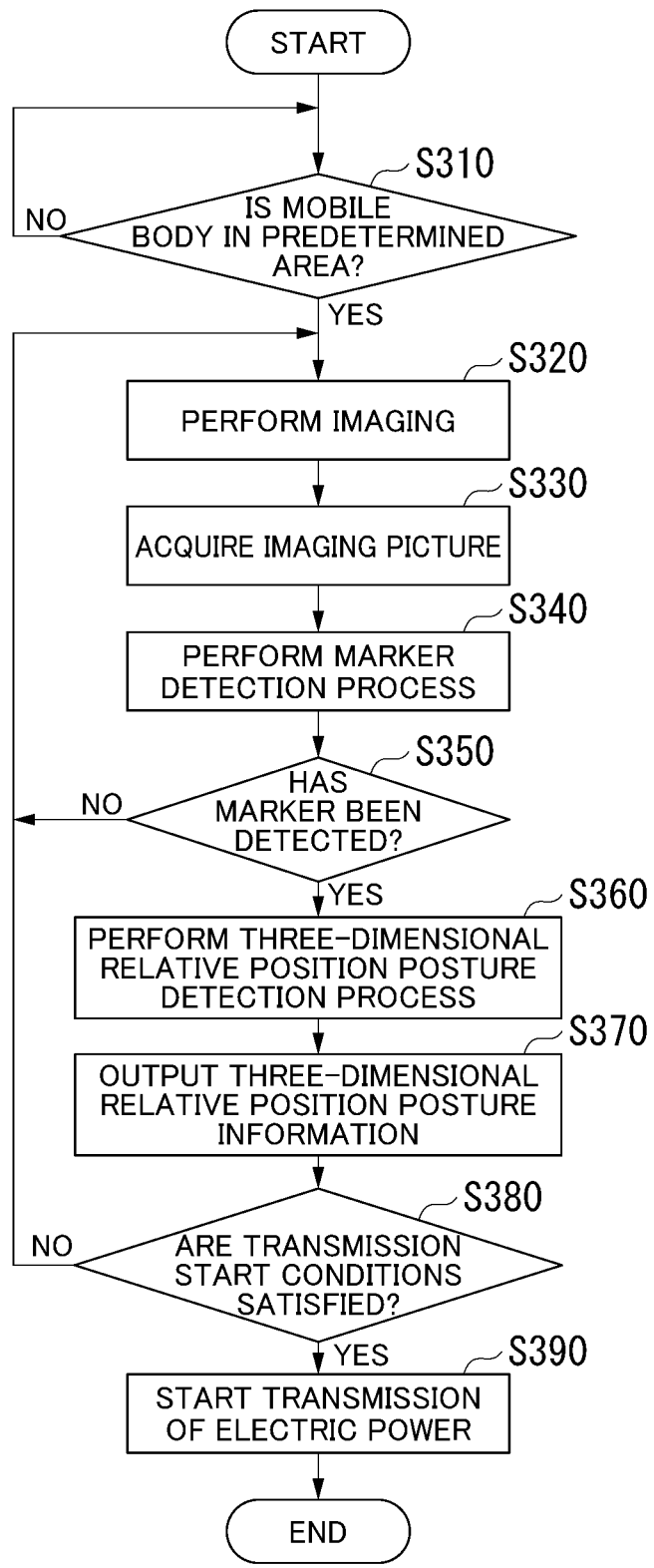
FIG. 7 is a diagram illustrating an example of the flow of a process of a wireless power transmission device 10 according to Modified Example 1 of the embodiment starting power transmission through wireless power transmission.

Hereinafter, the process of the wireless power transmission device 10 according to Modified example 1 of the embodiment starting transmission of electric power through wireless power transmission will be described with reference to FIG. 7. FIG. 7 is a diagram illustrating an example of the flow of a process of the wireless power transmission device 10 according to Modified Example 1 of the embodiment starting transmission of electric power through wireless power transmission. Hereinafter, as an example, a case in which a mobile body in which the wireless power receiving device 20 is mounted starts movement into a predetermined area in a predetermined direction at a timing before the process of Step S310 illustrated in FIG. 7 is performed will be described. Hereinafter, as an example, a case in which a marker MK2 disposed in the wireless power receiving device 20 enters a range that can be imaged by the imaging unit C1 when a mobile body enters the inside of a predetermined area in a predetermined direction will be described.

The control unit 113 waits until a mobile body enters the inside of the predetermined area (Step S310). A method for determining whether or not a mobile body has entered the inside of the predetermined area may be a known method or may be a method developed in the future.

In a case in which it is determined that a mobile body has entered the inside of the predetermined area (Step S310-Yes), the control unit 113 causes the imaging unit C1 to image a range that can be imaged by the imaging unit C1 (Step S320).

Next, the control unit 113 acquires a imaging picture imaged by the imaging unit C1 in Step S320 from the imaging unit C1 (Step S330). In this case, the control unit 113 acquires detection distance information representing a detection distance detected using the auto-focus function used for imaging the imaging picture by the imaging unit C1 together with the imaging picture.

Next, the control unit 113 performs a marker detection process for detecting a marker MK2 from the imaging picture based on the imaging picture acquired in Step S330 (Step S340). A method for detecting a marker MK2 from the imaging picture may be a known method or may be a method developed in the future.

Next, the control unit 113 determines whether or not the marker MK2 has been detected by the marker detection process of Step S340 (Step S350).

In a case in which it is determined that the marker MK2 has not been detected by the marker detection process (Step S350-No), the control unit 113 causes the process to proceed to Step S320 and causes the imaging unit C1 to image a range that can be imaged by the imaging unit C1 again.

On the other hand, in a case in which it is determined that the marker MK2 has been detected by the marker detection process (Step S350-Yes), the control unit 113 performs the three-dimensional relative position posture detection process as an example of the process of detecting a relative distance described above (Step S360). The three-dimensional relative position posture detection process performed in Step S360 is similar to the three-dimensional relative position posture detection process performed in Step S160, and thus description thereof will be omitted. In addition, a configuration of the marker MK2 that relates to a first feature point, a second feature point, and a third feature point is similar to the configuration of the marker MK1 that relates to the first feature point, the second feature point, and the third feature point, and thus description thereof will be omitted. In addition, the control unit 113 may be configured to perform a three-dimensional relative position detection process in place of the three-dimensional relative position posture detection process in Step S360. In such a case, parts respectively corresponding to the first part to the third part may be configured not to be provided in the marker MK2. In addition, the control unit 113 may be configured to perform a three-dimensional relative posture detection process in place of the three-dimensional relative position posture detection process in Step S360. In addition, the control unit 113 may be configured to perform a relative distance detection process in place of the three-dimensional relative position posture detection process in Step S360. Also in this case, parts respectively corresponding to the first part to the third part may be configured not to be provided in the marker MK2.

After the process of Step S360 is performed, the control unit 113 generates information including relative distance information representing the relative distances detected in Step S360, relative position information representing the relative positions, and relative posture information representing the relative posture as three-dimensional relative position posture information. Then, the control unit 113 outputs the generated three-dimensional relative position posture information to the wireless power receiving device 20 (Step S370).

Next, the control unit 113 determines whether or not the predetermined transmission start conditions described above are satisfied based on the relative distance, the relative position, and the relative posture detected in Step S360 (Step S380).

In a case in which it is determined that the transmission start conditions are not satisfied (Step S380-No), the control unit 113 causes the process to proceed to Step S320 and causes the imaging unit C1 to image a range that can be imaged by the imaging unit C1 again.

On the other hand, in a case in which it is determined that the transmission start conditions are satisfied (Step S380-Yes), the control unit 113 stars transmission of electric power through wireless power transmission (Step S390) and ends the process of the flowchart illustrated in FIG. 7. The process of Step S390 may be configured to include various processes performed before start of the transmission of electric power as a preparation of the transmission of electric power or may be configured to include a process of waiting for a predetermined time before the start of the transmission of electric power.

Figure 8:
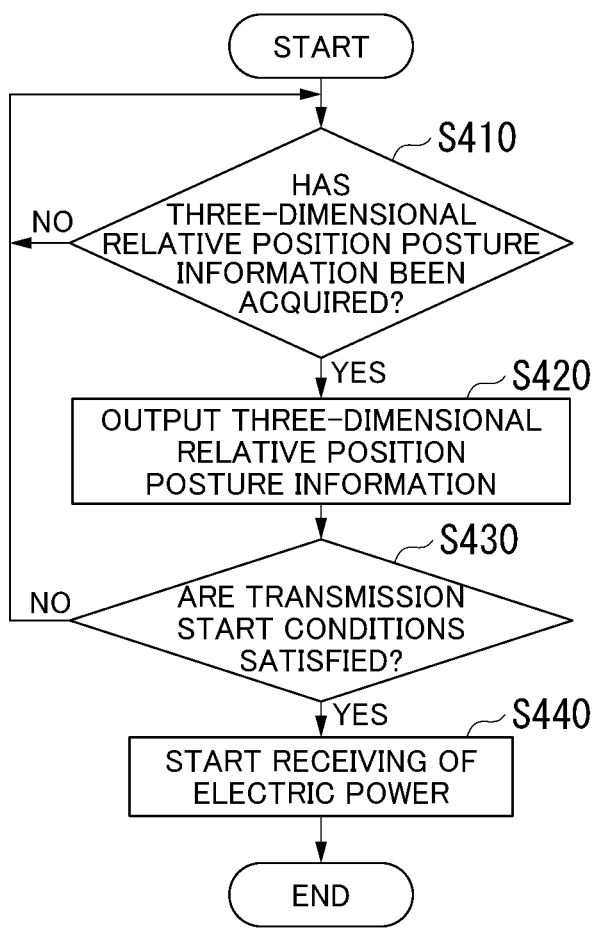
FIG. 8 is a diagram illustrating an example of the flow of a process performed by a wireless power receiving device 20 included in a mobile body located within a predetermined area.

Here, the process performed by the wireless power receiving device 20 that has acquired the three-dimensional relative position posture information output in Step S370 will be described with reference to FIG. 8. FIG. 8 is a diagram illustrating an example of the flow of the process performed by the wireless power receiving device 20 included in a mobile body located inside a predetermined area.

The control unit 222 waits until the three-dimensional relative position posture information is acquired from the wireless power transmission device 10 (Step S410).

Next, the control unit 222 outputs the three-dimensional relative position posture information acquired in Step S410 to the mobile body control unit 42 (Step S420). The process performed by the mobile body control unit 42 that has acquired the three-dimensional relative position posture information output in Step S420 is similar to the process of the flowchart illustrated in FIG. 5, and thus description thereof will be omitted.

Next, the control unit 222 determines whether or not the transmission start conditions am satisfied based on the three-dimensional relative position posture information acquired in Step S410 (Step S430). The process of Step S430 is similar to the process of Step S180, and thus description thereof will be omitted.

In a case in which it is determined that the transmission start conditions am not satisfied (Step S430-No), the control unit 222 causes the process to proceed to Step S410 and waits again until the three-dimensional relative position posture information is acquired from the wireless power transmission device 10.

On the other hand, in a case in which it is determined that the transmission start conditions are satisfied (Step S430-Yes), the control unit 222 starts receiving of electric power through wireless power transmission (Step S440) and ends the process of the flowchart illustrated in FIG. 8. The process of Step S440 may be configured to include various processes performed before start of the receiving of electric power as a preparation of the reception of electric power or may be configured to include a process of waiting for a predetermined time before the start of the receiving of electric power.

As described above, the wireless power transmission device 10 causes the imaging unit C1 to image a range that can be imaged by the imaging unit C1 and, in a case in which a marker MK2 located at the second position on the outer surface of the wireless power receiving device 20 is imaged by the imaging unit C2, performs transmission of AC power from the power transmission coil L1 to the power receiving coil L2 based on a detection distance detected by the auto-focus function used by the imaging unit C2 for imaging the marker MK2. In accordance with this, the wireless power receiving device 20 can easily cause the relative distance to coincide with a desired distance. In the example described above, the wireless power transmission device 10 can easily cause the relative distance to coincide with a desired distance and can easily cause the relative posture to coincide with a desired posture by causing the relative position to coincide with the desired position.

In addition, in a case in which a code in which various kinds of information is encoded like a QR code is the marker MK2, power receiving device identification information for identifying the wireless power receiving device 20 may be configured to be encoded in the marker MK2. In such a case, in a case in which the marker MK2 is imaged by the imaging unit C1, the control unit 113 detects power receiving device identification information based on the imaging picture imaged by the imaging unit C1, adjusts a magnitude and the like of AC power transmitted from the power transmission coil L1 to the power receiving coil L2 based on the detected power receiving device identification information, and performs transmission of AC power after adjustment from the power transmission coil L1 to the power receiving coil L2. In accordance with this, the wireless power transmission device 10 can perform transmission of appropriate AC power to the wireless power receiving device 20. Here, the code may be a one-dimensional code or may be a two-dimensional code.

In addition, the wireless power transmission device 10 may be configured to determine that the transmission start conditions are satisfied in a case in which the third condition described above is not satisfied, and the first condition and the second condition are satisfied in Step S380. In such a case, in Step S430, the wireless power receiving device 20 determines that the transmission start conditions are satisfied in a case in which the third condition is not satisfied, and the first condition and the second condition are satisfied. Then, in Step S390, for example, in a case in which a value representing the magnitude of the relative posture detected in Step S360 exceeds a reference value, the wireless power transmission device 10 limits transmission of electric power from the power transmission coil L1 to the power receiving coil L2. In addition, the wireless power transmission device 10 may be configured to change a degree of limit of the transmission of electric power in accordance with a difference between the value and the reference value. In accordance with this, the wireless power transmission device 10 can inhibit a risk that may occur in accordance with start of wireless power transmission in a state in which defects in attachment of the power transmission coil L1 and the power receiving coil L2, detachment of each of the power transmission coil L1 and the power receiving coil L2, and the like have occurred.

Modified Example 2 of Embodiment

Hereinafter, Modified example 2 of the embodiment will be described. In Modified example 2 of the embodiment, the same reference numerals will be assigned to the same components as those according to the embodiment and Modified example 1 of the embodiment, and description thereof will be omitted.

Also in Modified example 2 of the embodiment, similar to Modified example 1 of the embodiment, the wireless power receiving device 20 does not include the imaging unit C2, and the wireless power transmission device 10 includes an imaging unit C1. In addition, also in Modified example 2 of the embodiment, similar to Modified example 1 of the embodiment, the marker MK1 is not disposed at a predetermined first position on the outer surface of the wireless power transmission device 10, and a marker MK2 is disposed at a predetermined second position on the outer surface of the wireless power receiving device 20. In this case, the power transmission unit 11 of the wireless power transmission device 10 includes a communication unit 114 in addition to the power transmission circuit 111, the conversion circuit 112, and the control unit 113. In addition, in the case, the power receiving unit 22 of the wireless power receiving device 20 includes a communication unit 223 in addition to the rectification circuit 221 and the control unit 222. However, in Modified example 2 of the embodiment, the wireless power transmission device 10 does not perform the three-dimensional position posture detection process and determination of whether or not the transmission start conditions are satisfied.

<Process of Wireless Power Transmission Device Starting Transmission of Electric Power Through Wireless Power Transmission>

Figure 9:
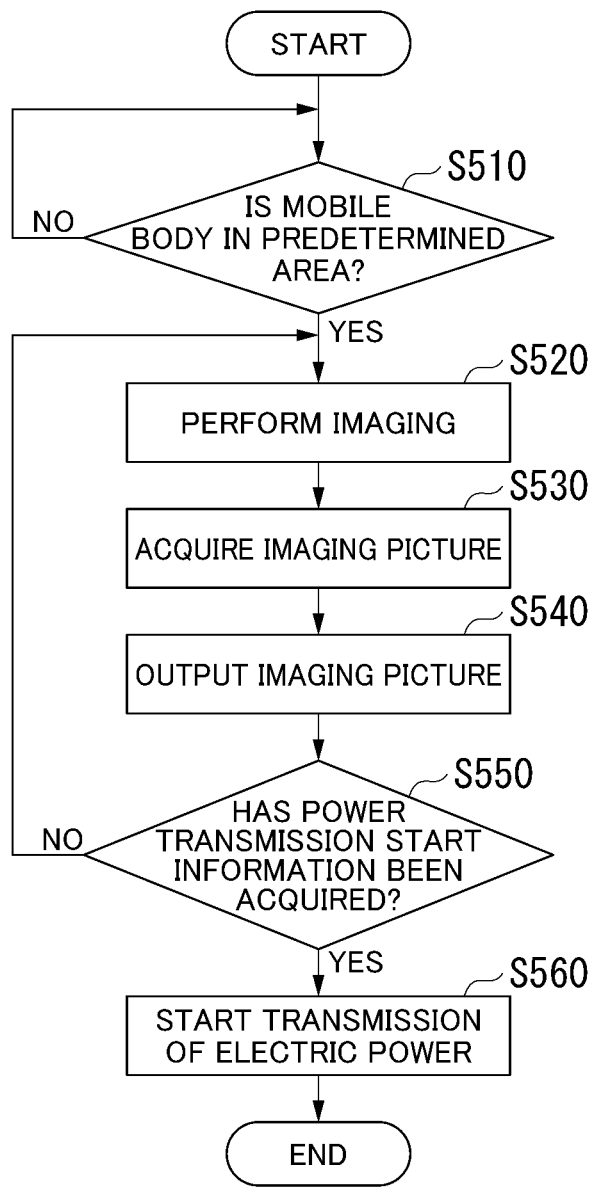
FIG. 9 is a diagram illustrating an example of the flow of a process of a wireless power transmission device 10 according to Modified Example 2 of the embodiment starting power transmission through wireless power transmission.

Hereinafter, the process of the wireless power transmission device 10 according to Modified example 2 of the embodiment starting transmission of electric power through wireless power transmission will be described with reference to FIG. 9. FIG. 9 is a diagram illustrating an example of the flow of a process of the wireless power transmission device 10 according to Modified Example 2 of the embodiment starting transmission of electric power through wireless power transmission. Hereinafter, as an example, a case in which a mobile body in which the wireless power receiving device 20 is mounted starts movement into a predetermined area in a predetermined direction at a timing before the process of Step S310 illustrated in FIG. 9 is performed will be described. Hereinafter, as an example, a case in which a marker MK2 disposed in the wireless power receiving device 20 enters a range that can be imaged by the imaging unit C1 when a mobile body enters the inside of a predetermined area in a predetermined direction will be described.

The control unit 113 waits until a mobile body enters the inside of the predetermined area (Step S510). A method for determining whether or not a mobile body has entered the inside of the predetermined area may be a known method or may be a method developed in the future.

In a case in which it is determined that a mobile body has entered the inside of the predetermined area (Step S510-Yes), the control unit 113 causes the imaging unit C1 to image a range that can be imaged by the imaging unit C1 (Step S520).

Next, the control unit 113 acquires a imaging picture imaged by the imaging unit C1 in Step S520 from the imaging unit C1 (Step S530). In this case, the control unit 113 acquires detection distance information representing a detection distance detected using the auto-focus function used for imaging the imaging picture by the imaging unit C1 together with the imaging picture.

Next, the control unit 113 outputs the imaging picture acquired in Step S530 to the wireless power receiving device 20 (Step S540). In this case, the control unit 113 outputs the detection distance information acquired in Step S530 to the wireless power receiving device 20 together with the imaging picture.

Next, the control unit 113 determines whether or not power transmission start information has been acquired from the wireless power receiving device 20 as a response to the imaging picture output to the wireless power receiving device 20 in Step S540 (Step S550). Here, the power transmission start information is information causing the wireless power transmission device 10 to start transmission of electric power to the wireless power receiving device 20 through wireless power transmission.

In a case in which it is determined that the power transmission start information has not been acquired from the wireless power receiving device 20 (Step S550-No), the control unit 113 causes the process to proceed to Step S520 and causes the imaging unit C1 to image a range that can be imaged by the imaging unit C1 again.

On the other hand, in a case in which it is determined that the power transmission start information has been acquired from the wireless power receiving device 20 (Step S550-Yes), the control unit 113 starts transmission of electric power through wireless power transmission (Step S560) and ends the process of the flowchart illustrated in FIG. 9. The process of Step S560 may be configured to include various processes performed before start of the transmission of electric power as a preparation of the transmission of electric power or may be configured to include a process of waiting for a predetermined time before the start of the transmission of electric power.

Figure 10:
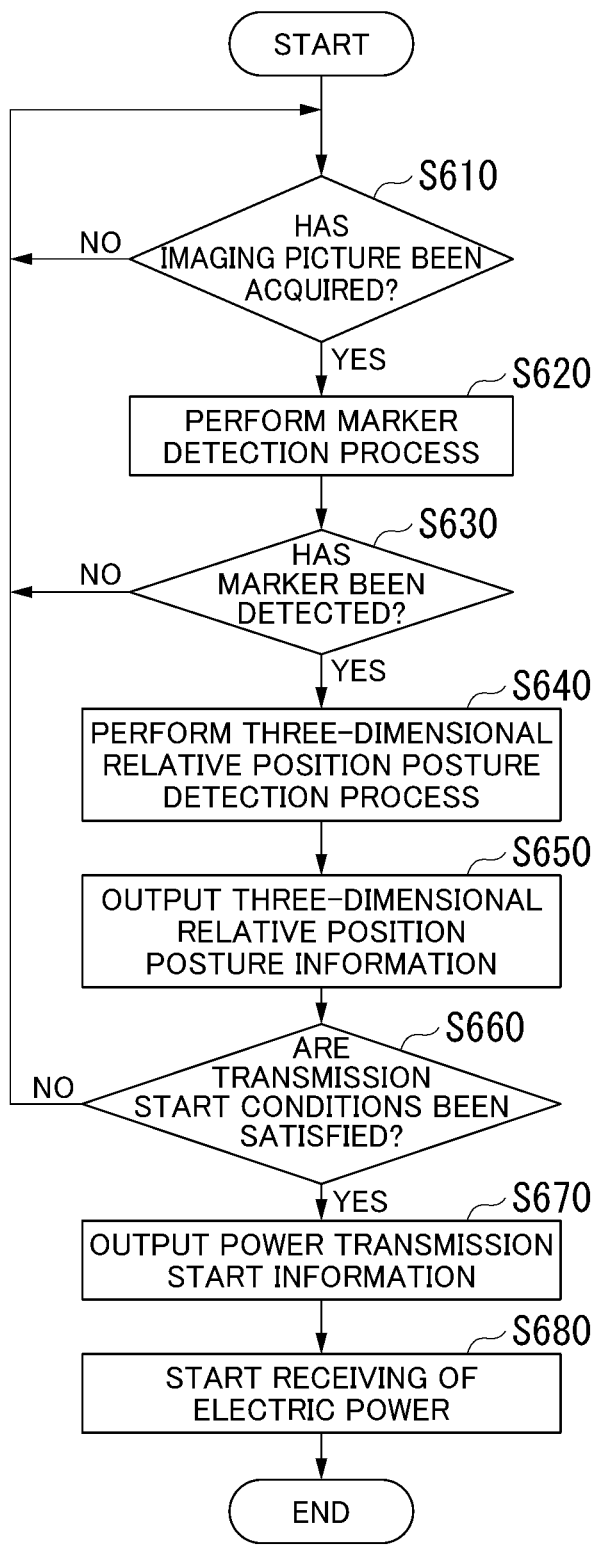
FIG. 10 is a diagram illustrating another example of the flow of a process performed by a wireless power receiving device 20 included in a mobile body located within a predetermined area.

Here, the process performed by the wireless power receiving device 20 that has acquired the imaging picture and the detection distance information output in Step S540 will be described with reference to FIG. 10. FIG. 10 is a diagram illustrating another example of the flow of the process performed by the wireless power receiving device 20 included in a mobile body located inside a predetermined area.

The control unit 222 waits until the imaging picture and the detection distance information are acquired from the wireless power transmission device 10 (Step S610).

In a case in which it is determined that the imaging picture and the detection distance information have been acquired from the wireless power transmission device 10 (Step S610-Yes), the control unit 222 performs a marker detection process of detecting a marker MK2 from the acquired imaging picture (Step S620). A method for detecting a marker MK2 from the imaging picture may be a known method or may be a method developed in the future.

Next, the control unit 222 determines whether or not the marker MK2 has been detected by the marker detection process of Step S620 (Step S630).

In a case in which it is determined that the marker MK2 has not been detected by the marker detection process (Step S630-No), the control unit 222 causes the process to proceed to Step S610 and waits again until the imaging picture and the detection distance information are acquired from the wireless power transmission device 10.

On the other hand, in a case in which it is determined that the marker MK2 has been detected by the marker detection process (Step S630-Yes), the control unit 222 performs a three-dimensional relative position posture detection process as an example of the process of detecting a relative distance (Step S640). The three-dimensional relative position posture detection process performed in Step S640 is similar to the three-dimensional relative position posture detection process performed in Step S160, and thus description thereof will be omitted. In addition, the control unit 222 may be configured to perform a three-dimensional relative position detection process in place of the three-dimensional relative position posture detection process in Step S640. In such a case, parts respectively corresponding to the first part to the third part may be configured not to be provided in the marker MK2. In addition, the control unit 222 may be configured to perform a three-dimensional relative posture detection process in place of the three-dimensional relative position posture detection process in Step S640. In addition, the control unit 222 may be configured to perform a relative distance detection process in place of the three-dimensional relative position posture detection process in Step S640. Also in this case, parts respectively corresponding to the first part to the third part may be configured not to be provided in the marker MK2.

Next, the control unit 222 generates information including relative distance information representing the relative distances detected in Step S640, relative position information representing the relative positions, and relative posture information representing the relative posture as three-dimensional relative position posture information. Then, the control unit 222 outputs the generated three-dimensional relative position posture information to the mobile body control unit 42 (Step S650). The process performed by the mobile body control unit 42 that has acquired the three-dimensional relative position posture information output in Step S650 is similar to the process of the flowchart illustrated in FIG. 5, and thus description thereof will be omitted.

Next, the control unit 222 determines whether or not the transmission start conditions are satisfied based on the relative distance, the relative position, and the relative posture detected in Step S640 (Step S660).

In a case in which it is determined that the transmission start conditions are not satisfied (Step S660-No), the control unit 222 causes the process to proceed to Step S610 and waits again until the imaging picture and the detection distance information are acquired from the wireless power transmission device 10.

On the other hand, in a case in which it is determined that the transmission start conditions are satisfied (Step S660-Yes), the control unit 222 outputs the power transmission start information to the wireless power transmission device 10 (Step S670).

Next, the control unit 222 starts receiving of electric power through wireless power transmission (Step S680) and ends the process of the flowchart illustrated in FIG. 10. The process of Step S680 may be configured to include various processes performed before start of the receiving of electric power as a preparation of the receiving of electric power or may be configured to include a process of waiting for a predetermined time before the start of the receiving of electric power.

As described above, even in a case in which the wireless power transmission device 10 does not perform the three-dimensional position posture detection process and determination of whether the transmission start conditions are satisfied, the wireless power transmission device 10 and the wireless power receiving device 20 can easily cause the relative distance to coincide with a desired distance.

Modified Example 3 of Embodiment

Figure 11:
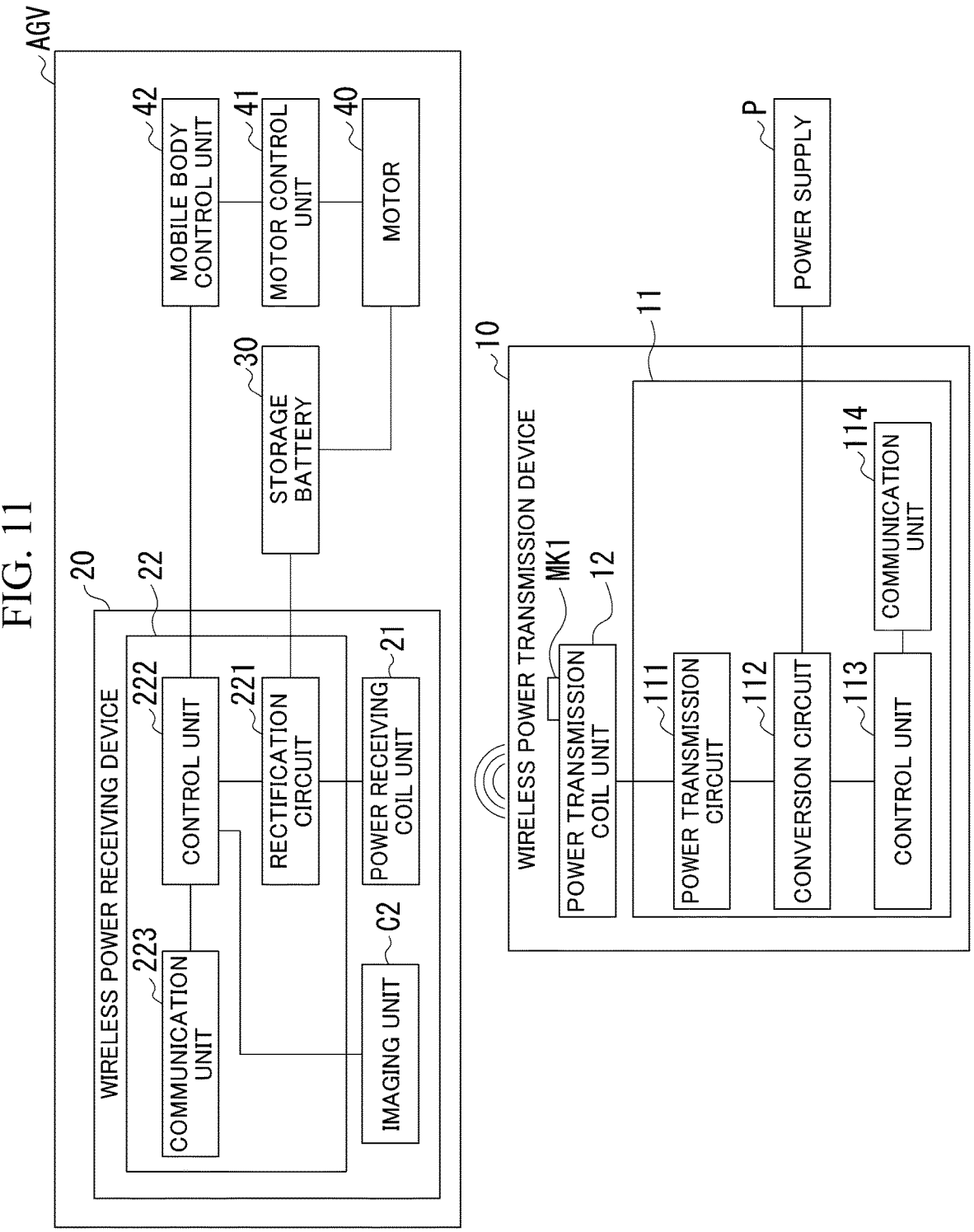
FIG. 11 is a diagram illustrating yet another example of configurations of the wireless power transmission device 10 included in the wireless power transmission system 1 and the wireless power receiving device 20 included in the wireless power transmission system 1.

Hereinafter, Modified example 3 of the embodiment will be described. In Modified example 3 of the embodiment, the same reference numerals will be assigned to the same components as those according to the embodiment, Modified example 1 of the embodiment, and Modified example 2 of the embodiment, and description thereof will be omitted. FIG. 11 is a diagram illustrating yet another example of configurations of the wireless power transmission device 10 included in the wireless power transmission system 1 and the wireless power receiving device 20 included in the wireless power transmission system 1.

In Modified example 3 of the embodiment, the wireless power receiving device 20 includes the imaging unit C2, and the wireless power transmission device 10 does not include the imaging unit C1. In addition, in Modified example 3 of the embodiment, the marker MK1 is disposed at a predetermined first position on the outer surface of the wireless power transmission device 10, and a marker MK2 is not disposed at a predetermined second position on the outer surface of the wireless power receiving device 20. The power transmission unit 11 of the wireless power transmission device 10 includes a communication unit 114 in addition to the power transmission circuit 111, the conversion circuit 112, and the control unit 113. In addition, the power receiving unit 22 of the wireless power receiving device 20 includes a communication unit 223 in addition to the rectification circuit 221 and the control unit 222. However, in Modified example 3 of the embodiment, the wireless power receiving device 20 does not perform the three-dimensional position posture detection process.

<Process of Wireless Power Receiving Device Starting Receiving of Electric Power Through Wireless Power Transmission>

Figure 12:
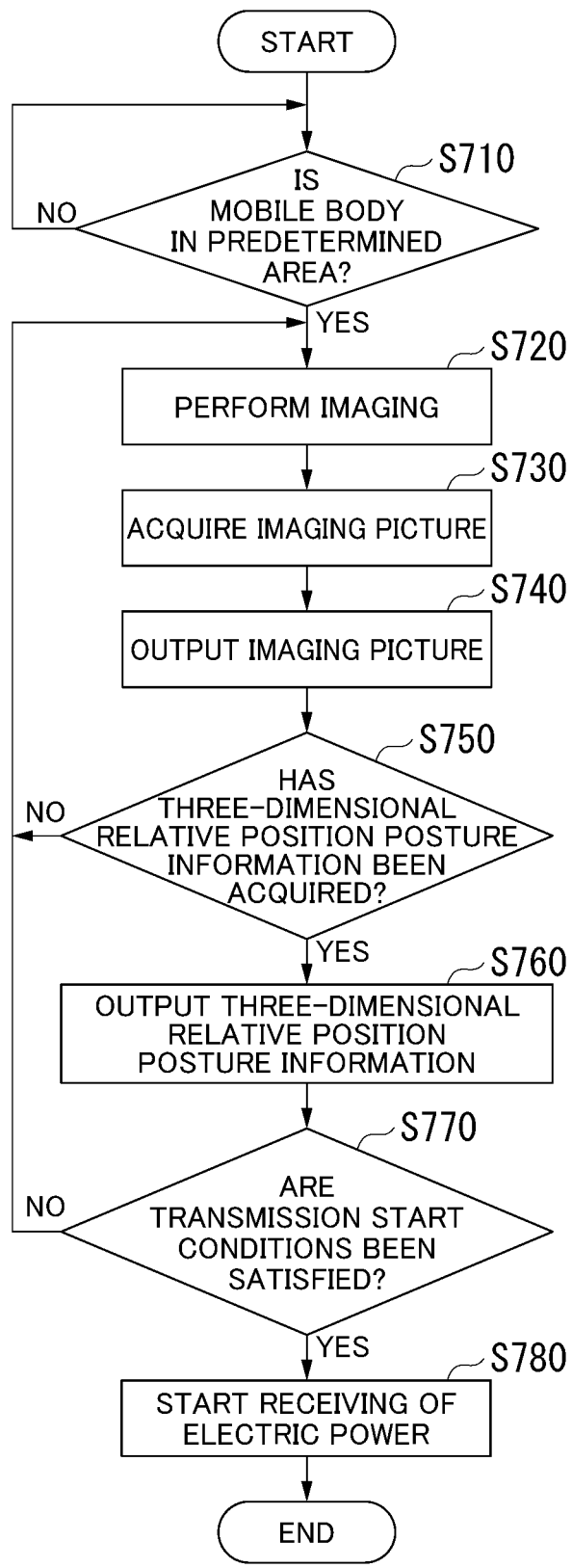
FIG. 12 is a diagram illustrating an example of the flow of a process of a wireless power receiving device 20 according to Modified Example 3 of the embodiment starting receiving of electric power through wireless power transmission.

Hereinafter, the process of the wireless power receiving device 20 according to Modified example 3 of the embodiment starting receiving of electric power through wireless power transmission will be described with reference to FIG. 12. FIG. 12 is a diagram illustrating an example of the flow of a process of the wireless power receiving device 20 according to Modified Example 3 of the embodiment starting receiving of electric power through wireless power transmission. Hereinafter, as an example, a case in which a mobile body in which the wireless power receiving device 20 is mounted starts movement into a predetermined area in a predetermined direction at a timing before the process of Step S710 illustrated in FIG. 12 is performed will be described. Hereinafter, as an example, a case in which a marker MK1 disposed in the wireless power transmission device 10 enters a range that can be imaged by the imaging unit C2 when a mobile body enters the inside of a predetermined area in a predetermined direction will be described.

The control unit 222 waits until a mobile body enters the inside of the predetermined area (Step S710). A method for determining whether or not a mobile body has entered the inside of the predetermined area may be a known method or may be a method developed in the future.

In a case in which it is determined that a mobile body has entered the inside of the predetermined area (Step S710-Yes), the control unit 222 causes the imaging unit C2 to image a range that can be imaged by the imaging unit C2 (Step S720).

Next, the control unit 222 acquires a imaging picture imaged by the imaging unit C2 in Step S720 from the imaging unit C2 (Step S730). In this case, the control unit 222 acquires detection distance information representing a detection distance detected using the auto-focus function used for imaging the imaging picture by the imaging unit C2 together with the imaging picture.

Next, the control unit 222 outputs the imaging picture and the detection distance information acquired in Step S730 to the wireless power transmission device 10 (Step S740).

Next, the control unit 222 determines whether or not three-dimensional relative position posture information has been acquired from the wireless power transmission device 10 as a response to the imaging picture and the detection distance information output to the wireless power transmission device 10 in Step S740 (Step S750). In Step S750, the control unit 222 may be configured to determine whether or not three-dimensional relative position information has been acquired from the wireless power transmission device 10 as the response. In addition, in Step S750, the control unit 222 may be configured to determine whether or not three-dimensional relative posture information has been acquired from the wireless power transmission device 10 as the response. Furthermore, in Step S750, the control unit 222 may be configured to determine whether or not relative distance information has been acquired from the wireless power transmission device 10 as the response.

In a case in which it is determined that the three-dimensional relative position posture information has not been acquired from the wireless power transmission device 10 (Step S750-No) the control unit 222 causes the process to proceed to Step S720 and causes the imaging unit C2 to image a range that can be imaged by the imaging unit C2 again.

On the other hand, in a case in which it is determined that the three-dimensional relative position posture information has been acquired from the wireless power transmission device 10 (Step S750: Yes), the control unit 222 outputs the acquired three-dimensional relative position posture information to the mobile body control unit 42 (Step S760). The process performed by the mobile body control unit 42 that has acquired the three-dimensional relative position posture information output in Step S760 is similar to the process of the flowchart illustrated in FIG. 5, and thus description thereof will be omitted.

Next, the control unit 222 determines whether or not the transmission start conditions are satisfied based on the three-dimensional relative position posture information acquired in Step S750 (Step S770). The process of Step S770 is similar to the process of Step S180, and thus description thereof will be omitted.

In a case in which it is determined that the transmission start conditions are not satisfied (Step S770-No), the control unit 222 causes the process to proceed to Step S720 and causes the imaging unit C2 to image a range that can be imaged by the imaging unit C2 again.

On the other hand, in a case in which it is determined that the transmission start conditions are satisfied (Step S770-Yes), the control unit 222 starts receiving of electric power through wireless power transmission (Step S780) and ends the process of the flowchart illustrated in FIG. 12. The process of Step S780 may be configured to include various processes performed before start of the receiving of electric power as a preparation of the receiving of electric power or may be configured to include a process of waiting for a predetermined time before the start of the receiving of electric power.

Figure 13:
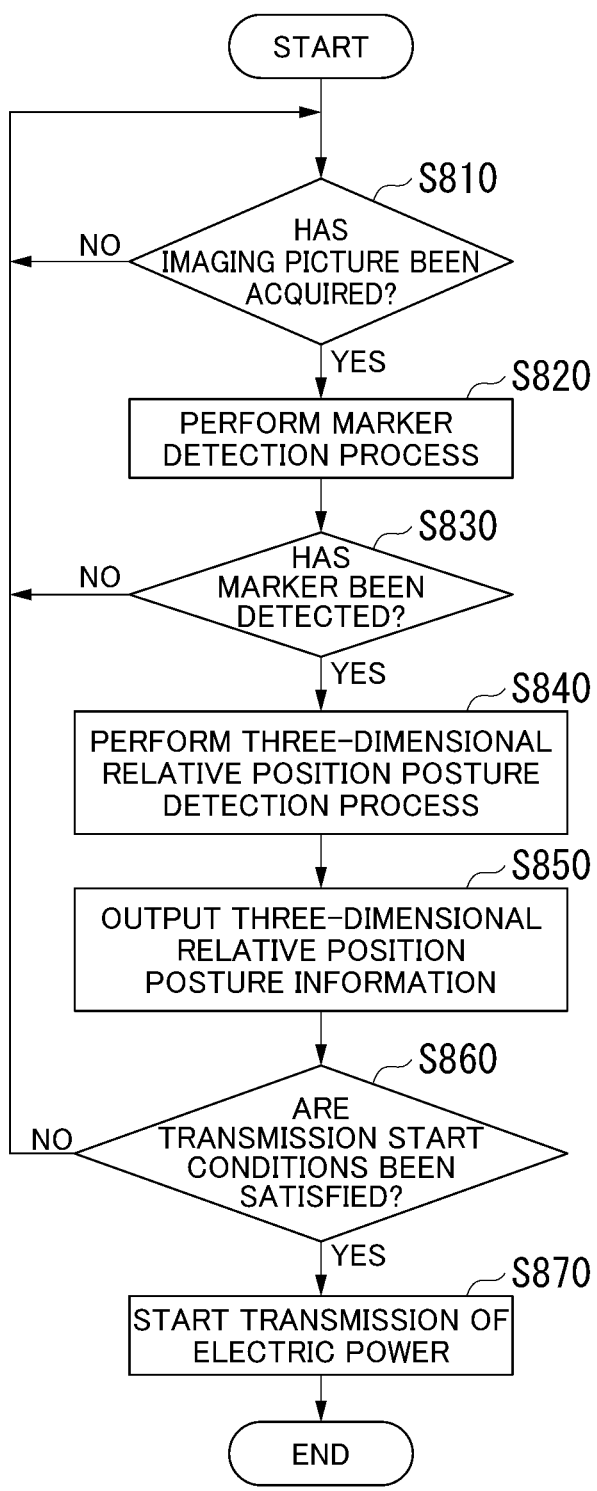
FIG. 13 is a diagram illustrating an example of the flow of a process performed by the wireless power transmission device 10 that has acquired a imaging picture and detection distance information output in Step S740.

Here, the process performed by the wireless power transmission device 10 that has acquired the imaging picture and the detection distance information output in Step S740 will be described with reference to FIG. 13. FIG. 13 is a diagram illustrating an example of the flow of a process performed by the wireless power transmission device 10 that has acquired a imaging picture and detection distance information output in Step S740.

The control unit 113 waits until the imaging picture and the detection distance information are acquired from the wireless power receiving device 20 (Step S810).

In a case in which it is determined that the imaging picture and the detection distance information have been acquired from the wireless power receiving device 20 (Step S810-Yes), the control unit 113 performs a marker detection process of detecting a marker MK1 from the acquired imaging picture (Step S820). A method for detecting a marker MK1 from the imaging picture may be a known method or may be a method developed in the future.

Next, the control unit 113 determines whether or not the marker MK1 has been detected by the marker detection process of Step S820 (Step S830).

In a case in which it is determined that the marker MK1 has not been detected by the marker detection process (Step S830-No), the control unit 113 causes the process to proceed to Step S810 and waits again until the imaging picture and the detection distance information are acquired from the wireless power receiving device 20.

On the other hand, in a case in which it is determined that the marker MK1 has been detected by the marker detection process (Step S830-Yes), the control unit 113 performs a three-dimensional relative position posture detection process as an example of the process of detecting a relative distance (Step S840). The three-dimensional relative position posture detection process performed in Step S840 is similar to the three-dimensional relative position posture detection process performed in Step S160, and thus description thereof will be omitted. In addition, the control unit 113 may be configured to perform a three-dimensional relative position detection process in place of the three-dimensional relative position posture detection process in Step S840. In such a case, parts respectively corresponding to the first part to the third part may be configured not to be provided in the marker MK1. In addition, the control unit 113 may be configured to perform a three-dimensional relative posture detection process in place of the three-dimensional relative position posture detection process in Step S840. In addition, the control unit 113 may be configured to perform a relative distance detection process in place of the three-dimensional relative position posture detection process in Step S840. Also in this case, parts respectively corresponding to the first part to the third part may be configured not to be provided in the marker MK1.

Next, the control unit 113 generates information including relative distance information representing the relative distances detected in Step S840, relative position information representing the relative positions, and relative posture information representing the relative posture as three-dimensional relative position posture information. Then, the control unit 113 outputs the generated three-dimensional relative position posture information to the wireless power receiving device 20 (Step S850).

Next, the control unit 113 determines whether or not the transmission start conditions are satisfied based on the relative distance, the relative position, and the relative posture detected in Step S840 (Step S860).

In a case in which it is determined that the transmission start conditions are not satisfied (Step S860-No), the control unit 113 causes the process to proceed to Step S810 and waits again until the imaging picture and the detection distance information are acquired from the wireless power receiving device 20.

On the other hand, in a case in which it is determined that the transmission start conditions are satisfied (Step S860-Yes), the control unit 113 starts transmission of electric power through wireless power transmission (Step S870) and ends the process of the flowchart illustrated in FIG. 13. The process of Step S870 may be configured to include various processes performed before start of the transmission of electric power as a preparation of the transmission of electric power or may be configured to include a process of waiting for a predetermined time before the start of the transmission of electric power.

As described above, even in a case in which the wireless power receiving device 20 does not perform the three-dimensional position posture detection process, the wireless power transmission device 10 and the wireless power receiving device 20 can easily cause the relative distance to coincide with a desired distance.

<Specific Example 1 of Positional Relation Between Coil and Imaging Unit>

Hereinafter, Specific example 1 of each of a positional relation between the power receiving coil L2 and the imaging unit C2 of a case in which the wireless power receiving device 20 includes the imaging unit C2 and a positional relation between the power transmission coil L1 and the imaging unit C1 of a case in which the wireless power transmission device 10 includes the imaging unit C1 will be described.

FIG. 14 is a diagram illustrating an example of a positional relation between the power receiving coil L2 and the imaging unit C2 of a case in which the wireless power receiving device 20 includes the imaging unit C2. FIG. 14 is a diagram illustrating the positional relation when seen in an axial direction of an axis A2. Here, in the example illustrated in FIG. 14, the power receiving coil L2 is a coil made of a second conductor winding spirally around the axis A2, in other words, a spiral coil. In FIG. 14, in order to simplify the drawing, the power receiving coil L2 is represented as an object having a circular ring shape. In FIG. 14, the magnetic body M2 described above is arranged in the rear of the power receiving coil L2. In other words, the magnetic body M2 is arranged to be lined up with the power receiving coil L2 in the axial direction of the axis A2 in the example. In other words, the magnetic body M2 overlaps the power receiving coil L2 when the power receiving coil unit 21 is seen in the axial direction of the axis A2 in the example. More specifically, in the example, the entire outline of the power receiving coil L2 is included inside the outline of the magnetic body M2 in the case. On the other hand, in the example, the entire outline of the imaging unit C2 does not overlap the entire outline of the power receiving coil L2 and does not overlap the outline of the magnetic body M2 in the case. In other words, in the example, the imaging unit C2 is located at a position not overlapping the magnetic body M2 in the axial direction of the axis A2. In accordance with this, the wireless power receiving device 20 can inhibit a magnetic flux generated by the power receiving coil L2 from giving noise to the imaging unit C2.

FIG. 15 is a diagram illustrating an example of a positional relation between the power receiving coil L2 and the imaging unit C2 in a state in which the power transmission coil L1 and the power receiving coil L2 face each other. The positional relation illustrated in FIG. 15 is the positional relation illustrated in FIG. 14. FIG. 15 is a diagram illustrating an example of the positional relation when the power transmission coil unit 12 is seen in a direction orthogonal to the axis A2. In FIG. 15, a cross-sectional view of the power receiving coil L2 and the magnetic body M2 cut in a plane including the axis A2 is illustrated inside the casing of the power receiving coil unit 21. The reason for this is to clearly represent that the imaging unit C2 is located at a position not overlapping the magnetic body M2 in the axial direction of the axis A2. In accordance with this, in FIG. 15, a cross-sectional view of the power transmission coil L1 and the magnetic body M1 cut in a plane including the axis A1 is illustrated inside the casing of the power transmission coil unit 12.

In addition, a positional relation between the power transmission coil L1 and the imaging unit C1 of a case in which the wireless power transmission device 10 includes the imaging unit C1 is the same as a positional relation between the power receiving coil L2 and the imaging unit C2 of a case in which the wireless power receiving device 20 includes the imaging unit C2. In other words, the imaging unit C1 is located at a position not overlapping the magnetic body M1 in the axial direction of the axis A1.

<Specific Example 2 of Positional Relation Between Coil and Imaging Unit>

Hereinafter, Specific example 2 of each of a positional relation between the power receiving coil L2 and the imaging unit C2 of a case in which the wireless power receiving device 20 includes the imaging unit C2 and a positional relation between the power transmission coil L1 and the imaging unit C1 of a case in which the wireless power transmission device 10 includes the imaging unit C1 will be described.

FIG. 16 is a diagram illustrating another example of a positional relation between the power receiving coil L2 and the imaging unit C2 of a case in which the wireless power receiving device 20 includes the imaging unit C2. FIG. 16 is a diagram illustrating the positional relation when seen in an axial direction of an axis A2. Here, in the example illustrated in FIG. 16, the power receiving coil L2 is a coil made of a second conductor winding spirally around the axis A2, in other words, a spiral coil. In FIG. 16, in order to simplify the drawing, the power receiving coil L2 is represented as an object having a circular ring shape. In FIG. 16, the magnetic body M2 described above is arranged in the rear of the power receiving coil L2. In other words, the magnetic body M2 is arranged to be lined up with the power receiving coil L2 in the axial direction of the axis A2 in the example. In other words, the magnetic body M2 overlaps the power receiving coil L2 when the power receiving coil unit 21 is seen in the axial direction of the axis A2 in the example. More specifically, in the example, the entire outline of the power receiving coil L2 is included inside the outline of the magnetic body M2 in the case.

Here, the magnetic body M2 has an opening H2 through which the axis A2 passes. In the example illustrated in FIG. 16, the opening H2 is an opening having a circular shape. In the example, the outline of the power receiving coil L2 and the outline of the opening H2 are concentric circles. A radius of the outline of the opening H2 is shorter than a radius of the outline of the inner edge of the power receiving coil L2 in the outline of the power receiving coil L2. For this reason, as described above, in the example, when the power receiving coil unit 21 is seen in the axial direction of the axis A2, the entire outline of the power receiving coil L2 is included inside the outline of the magnetic body M2.

In addition, in the example illustrated in FIG. 16, the entire outline of the imaging unit C2 is included on the inner side of the opening H2 when the power receiving coil unit 21 is seen in the axial direction of the axis A2. In other words, the imaging unit C2 is located at a position at which the entire imaging unit C2 is included in the opening H2 in the axial direction of the axis A2. Also in this case, the wireless power receiving device 20 can inhibit a magnetic flux generated by the power receiving coil L2 from giving noise to the imaging unit C2. In addition, in this case, in the wireless power receiving device 20, the imaging unit C2 does not need to be disposed on the outer surface, and occurrence of a defect in the imaging unit C2 due to other objects being in contact with the imaging unit C2 can be inhibited. Furthermore, in this case, in the wireless power receiving device 20, the imaging unit C2 is housed inside the wireless power receiving device 20, and thus the entire volume can be decreased. As a result, the degree of freedom for installation of the wireless power receiving device 20 can be improved.

FIG. 17 is a diagram illustrating another example of a positional relation between the power receiving coil L2 and the imaging unit C2 in a state in which the power transmission coil L1 and the power receiving coil L2 face each other. The positional relation illustrated in FIG. 17 is the positional relation illustrated in FIG. 16. FIG. 17 is a diagram illustrating an example of the positional relation when the power transmission coil unit 12 is seen in a direction orthogonal to the axis A2. In FIG. 17, a cross-sectional view of the power receiving coil L2 and the magnetic body M2 cut in a plane including the axis A2 is illustrated inside the casing of the power receiving coil unit 21. The reason for this is to clearly represent that the imaging unit C2 is located at a position at which the entire imaging unit C2 is included in the opening H2 in the axial direction of the axis A2. In accordance with this, in FIG. 17, a cross-sectional view of the power transmission coil L1 and the magnetic body M1 cut in a plane including the axis A1 is illustrated inside the casing of the power transmission coil unit 12.

Here, as illustrated in FIGS. 16 and 17, it is preferable that a gap is present between the imaging unit C2 and the magnetic body M2. In accordance with this, the wireless power receiving device 20 can more reliably inhibit a magnetic flux generated by the power receiving coil L2 from giving noise to the imaging unit C2.

In addition, the magnetic body M2 may be configured not to have the opening H2. In this case, when the power receiving coil unit 21 is seen in the axial direction of the axis A2, the imaging unit C2 overlaps the magnetic body M2 and is included on the inner side of the inner edge of the power receiving coil L2. Also in this case, the wireless power receiving device 20 can inhibit a magnetic flux generated by the power receiving coil L2 from giving noise to the imaging unit C2.

In addition, a positional relation between the power transmission coil L1 and the imaging unit C1 of a case in which the wireless power transmission device 10 includes the imaging unit C1 is the same as a positional relation between the power receiving coil L2 and the imaging unit C2 of a case in which the wireless power receiving device 20 includes the imaging unit C2. In other words, the imaging unit C1 is located at a position at which the entire imaging unit C1 is included in the opening H1 in the axial direction of the axis A1. Here, the opening H1 is an opening included in the magnetic body M1. The configuration of the opening H1 is similar to the configuration of the opening H2, and thus description thereof will be omitted. The opening H2 is an example of a first opening. The opening H1 is an example of a second opening.

<Specific Example 3 of Positional Relation Between Coil and Imaging Unit>

Hereinafter, Specific example 3 of each of a positional relation between the power receiving coil L2 and the imaging unit C2 of a case in which the wireless power receiving device 20 includes the imaging unit C2 and a positional relation between the power transmission coil L1 and the imaging unit C1 of a case in which the wireless power transmission device 10 includes the imaging unit C1 will be described.

Figure 18:
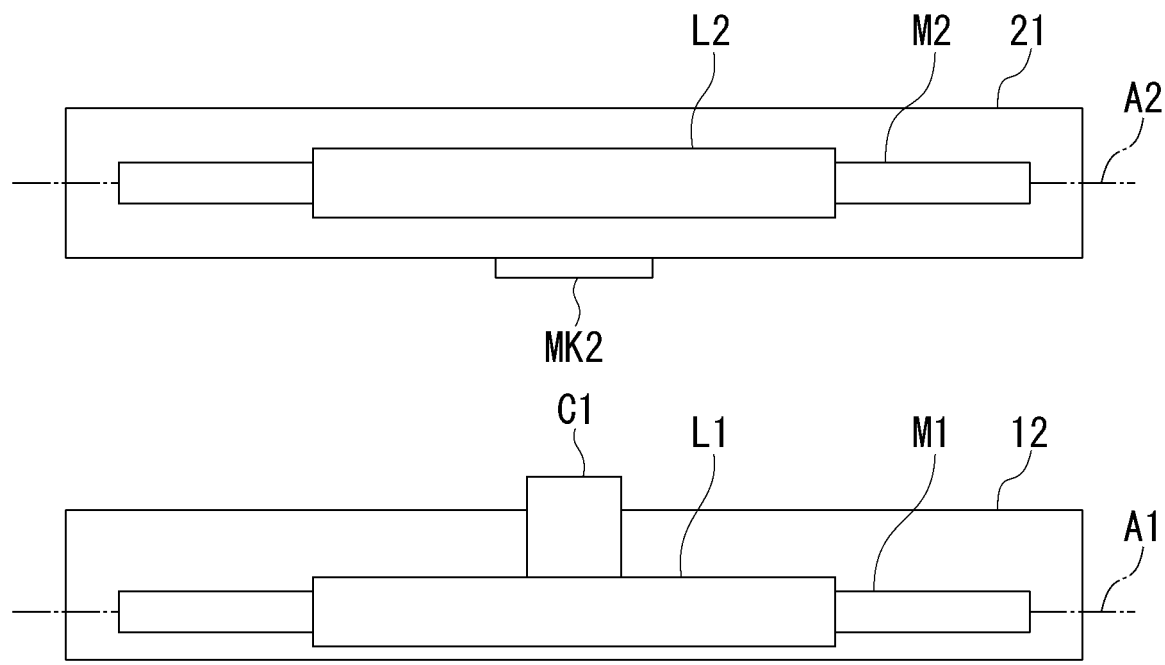
FIG. 18 is a diagram illustrating yet another example of a positional relation between the power transmission coil L1 and the imaging unit C1 in a state in which the power transmission coil L1 and the power receiving coil L2 face each other.

FIG. 18 is a diagram illustrating a yet another example of a positional relation between the power transmission coil L1 and the imaging unit C1 in a state in which the power transmission coil L1 and the power receiving coil L2 face each other. FIG. 18 is a diagram illustrating the positional relation when seen in a direction orthogonal to the axis A1. Here, in the example illustrated in FIG. 18, the power transmission coil L1 is a coil made of a first conductor winding helically around the axis A1, in other words, a solenoid coil. In FIG. 18, in order to simplify the drawing, the power transmission coil L1 is represented as an object having a rectangular shape. In FIG. 18, the magnetic body M1 is arranged on the inner side of the inner edge of the power transmission coil L1. In addition, in the example, the power receiving coil L2 is a coil made of a second conductor winding helically around the axis A2, in other words, a solenoid coil. In FIG. 18, for simplifying the drawing, the power receiving coil L2 is illustrated as an object having a rectangular shape. In FIG. 18, the magnetic body M2 is arranged on the inner side of the inner edge of the power receiving coil L2.

In the example illustrated in FIG. 18, the imaging unit C1 is lined up with the power transmission coil L1 in a first parallel direction for intersecting the axial direction of the axis A1 and is located at a position interposed between both ends of the power transmission coil L1 in the first parallel direction (in other words, both ends of the solenoid coil in the axial direction of the axis A1). In the example, the first parallel direction is a direction of a line segment joining the power transmission coil L1 and the power receiving coil L2 at the shortest distance in a state in which the power transmission coil L1 and the power receiving coil L2 face each other among directions orthogonal to the axial direction of the axis A1. In accordance with this, even in a case in which the power transmission coil L1 is a solenoid coil, the wireless power transmission device 10 can inhibit a magnetic flux generated by the power transmission coil L1 from giving noise to the imaging unit C1. In addition, the first parallel direction may be another direction for intersecting the axial direction of the axis A1 as long as it is a direction in which the imaging unit C1 can be disposed in the wireless power transmission device 10 such that the marker MK2 is able to be imaged by the imaging unit C1 in the state.

In addition, a positional relation between the power receiving coil L2 and the imaging unit C2 of a case in which the wireless power receiving device 20 includes the imaging unit C2 is the same as a positional relation between the power transmission coil L1 and the imaging unit C1 of a case in which the wireless power transmission device 10 includes the imaging unit C1. In other words, the imaging unit C2 is lined up with the power receiving coil L2 in a second parallel direction for intersecting the axial direction of the axis A2 and is located at a position interposed between both ends of the power receiving coil L2 in the second parallel direction (in other words, both ends of the solenoid coil in the axial direction of the axis A2). In accordance with this, even in a case in which the power receiving coil L2 is a solenoid coil, the wireless power receiving device 20 can inhibit a magnetic flux generated by the power receiving coil L2 from giving noise to the imaging unit C2. Here, the second parallel direction is, for example, a direction of a line segment joining the power receiving coil L2 and the power transmission coil L1 at the shortest distance in a state in which the power transmission coil L1 and the power receiving coil L2 face each other among directions orthogonal to the axial direction of the axis A2. In addition, the second parallel direction may be another direction for intersecting the axial direction of the axis A2 as long as it is a direction in which the imaging unit C2 can be disposed in the wireless power receiving device 20 such that the marker MK1 is able to be imaged by the imaging unit C2 in the state.

As described above, a wireless power receiving device (the wireless power receiving device 20 in the example described above) according to the embodiment is a wireless power receiving device that receives AC power from a power transmission coil (the wireless power transmission coil L1 in the example described above) included in a wireless power transmission device (the power transmission device 10 in the example described above), the wireless power receiving device including: a power receiving coil (the power receiving coil L2 in the example described above) configured to receive the AC power from the power transmission coil; a power receiving-side imaging unit (the imaging unit C2 in the example described above) having an auto-focus function; and a control unit (the control unit 222 in the example described above) configured to cause the power receiving-side imaging unit to image a range that is able to be imaged by the power receiving-side imaging unit and, in a case in which a marker (the marker MK1 in the example described above) located at a predetermined first position on an outer surface of the wireless power transmission device is imaged by the power receiving-side imaging unit, to output relative distance information representing a relative distance of the power receiving coil with respect to the power transmission coil based on a detection distance detected using the auto-focus function used by the power receiving-side imaging unit for imaging the marker. In accordance with this, the wireless power receiving device can easily cause a relative distance of the power receiving coil with respect to the power transmission coil to coincide with a desired distance.

In the wireless power receiving device, a configuration in which the marker is a part of the outer surface of the wireless power transmission device may be used.

In addition, in the wireless power receiving device, a configuration in which the wireless power transmission device includes a power transmission coil unit (the power transmission coil unit 12 in the example described above) having the power transmission coil, and the marker is a part of an outer surface of the power transmission coil unit may be used.

In addition, in the wireless power receiving device, a configuration in which the wireless power receiving device includes a power receiving coil unit having a power receiving coil, and the marker is a part of an outer surface of the power receiving coil unit may be used.

In addition, in the wireless power receiving device, a configuration in which the marker is a picture attached to a part of the outer surface of the wireless power transmission device may be used.

In addition, in the wireless power receiving device, a configuration in which the wireless power transmission device includes a power transmission-side display unit that displays a picture, and the marker is a picture displayed on the power transmission-side display unit may be used.

In addition, a configuration in which the wireless power receiving device further includes a power receiving-side magnetic body (the magnetic body M2 in the example described above) that is lined up with the power receiving coil in an axial direction of a first axis (the axis A2 in the example described above), the power receiving coil is a coil made of a first conductor winding spirally around the first axis, and the power receiving-side imaging unit is located at a position not overlapping the power receiving-side magnetic body in the axial direction of the first axis may be used.

In addition, in the wireless power receiving device, a configuration in which the power receiving-side magnetic body has a first opening (the opening H1 in the example described above) through which the first axis passes, and the power receiving-side imaging unit is located at a position at which the entire power receiving-side imaging unit is included in the first opening in the axial direction of the first axis may be used.

In addition, in the wireless power receiving device, a configuration in which the power receiving coil is a coil made of a first conductor winding helically around a first axis, and the power receiving-side imaging unit is lined up with the power receiving coil in a first parallel direction intersecting an axial direction of the first axis and is located at a position interposed between both ends of the power receiving coil in the first parallel direction may be used.

In addition, in the wireless power receiving device, a configuration in which, in a case in which a relative position and a relative posture between the power transmission coil and the power receiving coil are a position and a posture with which the power transmission coil and the power receiving coil face each other, the marker is located at a position overlapping a center of a imaging picture among positions in the imaging picture in the imaging picture in which the marker is imaged by the power receiving-side imaging unit may be used.

In addition, in the wireless power receiving device, a configuration in which the marker has a first part (the first part P1 in the example described above) representing a first feature point (the first feature point P11 in the example described above) and a second part (the second part P2 in the example described above) representing a second feature point (the second feature point P21 in the example described above), and the second part is separated from the first part, and in a case in which the marker is imaged by the power receiving-side imaging unit, the control unit detects a relative posture of the power receiving coil with respect to the power transmission coil based on a distance (the first distance in the example described above) from the power receiving-side imaging unit to the first feature point represented by the first part and a distance (the second distance in the example described above) from the power receiving-side imaging unit to the second feature point represented by the second part among distances detected using the auto-focus function used by the power receiving-side imaging unit for imaging the marker may be used.

In addition, in the wireless power receiving device, a configuration in which the marker has a third part (the third part P3 in the example described above) representing a third feature point (the third feature point P31 in the example described above) in addition to the first part and the second part, the third feature point represented by the third part is separated from a line segment connecting the first feature point represented by the first part and the second feature point represented by the second part, and, in a case in which the marker is imaged by the power receiving-side imaging unit, the control unit detects the relative posture based on the distance from the power receiving-side imaging unit to the first feature point represented by the first part, the distance from the power receiving-side imaging unit to the second feature point represented by the second part, and a distance (the third distance in the example described above) from the power receiving-side imaging unit to the third feature point represented by the third part among distances detected using the auto-focus function used by the power receiving-side imaging unit for imaging the marker may be used.

In addition, in the wireless power receiving device, a configuration in which the control unit outputs relative posture information representing the detected relative posture may be used.

In addition, in the wireless power receiving device, a configuration in which, in a case in which the marker is imaged by the power receiving-side imaging unit, the control unit outputs the relative distance information based on the detection distance and outputs relative position information representing a relative position of the power receiving coil with respect to the power transmission coil based on a imaging picture imaged by the power receiving-side imaging unit may be used.

In addition, in the wireless power receiving device, a configuration in which the wireless power receiving device is mounted in a mobile body (the AGV in the example described above), and the mobile body adjusts a relative position between the power transmission coil and the power receiving coil based on the relative distance information and the relative position information output from the wireless power receiving device may be used.

In addition, in the wireless power receiving device, a configuration in which power transmission device identification information used for identifying the wireless power transmission device is encoded in the marker, and, in a case in which the marker is imaged by the power receiving-side imaging unit, the control unit outputs the power transmission device identification information based on a imaging picture imaged by the power receiving-side imaging unit may be used.

In addition, in the wireless power receiving device, a configuration in which the power transmission device identification information is encoded in the marker in the form of a one-dimensional code or a two-dimensional code may be used.

Furthermore, a wireless power transmission device according to the embodiment is a wireless power transmission device that transmits AC power to a power receiving coil included in a wireless power receiving device, the wireless power transmission device including: a power transmission coil configured to transmit the AC power to the power receiving coil; a power transmission-side imaging unit (the imaging unit C1 in the example described above) having an auto-focus function; and a control unit (the control unit 113 in the example described above) configured to cause the power transmission-side imaging unit to image a range that is able to be imaged by the power transmission-side imaging unit and, in a case in which a marker (the marker MK2 in the example described above) located at a predetermined second position on an outer surface of the wireless power receiving device is imaged by the power transmission-side imaging unit, to transmit the AC power to the power receiving coil using the power transmission coil based on a detection distance detected using the auto-focus function used by the power transmission-side imaging unit for imaging the marker. In accordance with this, the wireless power transmission device can easily cause a relative distance of the power receiving coil with respect to the power transmission coil to coincide with a desired distance.

In addition, in the wireless power transmission device, a configuration in which, in a case in which the marker is imaged by the power transmission-side imaging unit, the control unit outputs relative distance information representing a relative distance of the power receiving coil with respect to the power transmission coil based on the detection distance may be used.

In addition, in the wireless power transmission device, a configuration in which the marker is a part of the outer surface of the wireless power receiving device may be used.

In addition, in the wireless power transmission device, a configuration in which the wireless power receiving device includes a power receiving coil unit (the power receiving coil unit 21 in the example described above) including the power receiving coil, and the marker is a part of an outer surface of the power receiving coil unit may be used.

In addition, in the wireless power transmission device, a configuration in which the marker is a picture attached to a part of the outer surface of the wireless power receiving device may be used.

In addition, in the wireless power transmission device, a configuration in which the wireless power receiving device includes a power receiving-side display unit that displaying a picture, and the marker is a picture displayed on the power receiving-side display unit may be used.

In addition, in the wireless power transmission device, a configuration in which a power transmission-side magnetic body (the magnetic body M1 in the example described above) that is lined up with the power transmission coil in an axial direction of a second axis (the axis A1 in the example described above) is further included, the power transmission coil is a coil made of a second conductor winding spirally around the second axis, and the power transmission-side imaging unit is located at a position not overlapping the power transmission-side magnetic body in the axial direction of the second axis may be used.

In addition, in the wireless power transmission device, a configuration in which the power transmission-side magnetic body has a second opening (the opening H2 in the example described above) through which the second axis passes, and the power transmission-side imaging unit is located at a position at which the entire power transmission-side imaging unit is included in the second opening in the axial direction of the second axis may be used.

In addition, in the wireless power transmission device, a configuration in which the power transmission coil is a coil made of a second conductor winding helically around the second axis, and the power transmission-side imaging unit is lined up with the power transmission coil in a second parallel direction intersecting the axial direction of the second axis and is located at a position interposed between both ends of the power transmission coil in the second parallel direction may be used.

In addition, in the wireless power transmission device, a configuration in which, in a case in which a relative position and a relative posture between the power transmission coil and the power receiving coil are a position and a posture with which the power transmission coil and the power receiving coil face each other, the marker is located at a position overlapping a center of a imaging picture among positions in the imaging picture in the imaging picture in which the marker is imaged by the power transmission-side imaging unit may be used.

In addition, in the wireless power transmission device, a configuration in which the marker has a first part representing a first feature point and a second part representing a second feature point, and the second part is separated from the first part, and, in a case in which the marker is imaged by the power transmission-side imaging unit, the control unit detects a relative posture of the power receiving coil with respect to the power transmission coil based on a distance from the power transmission-side imaging unit to the first feature point represented by the first part and a distance from the power transmission-side imaging unit to the second feature point represented by the second part among distances detected using the auto-focus function used by the power transmission-side imaging unit for imaging the marker may be used.

In addition, in the wireless power transmission device, a configuration in which the marker has a third part representing a third feature point in addition to the first part and the second part, the third feature point represented by the third part is separated from a line segment connecting the first feature point represented by the first part and the second feature point represented by the second part, and, in a case in which the marker is imaged by the power transmission-side imaging unit, the control unit detects the relative posture based on the distance from the power transmission-side imaging unit to the first feature point represented by the first part, the distance from the power transmission-side imaging unit to the second feature point represented by the second part, and a distance from the power transmission-side imaging unit to the third feature point represented by the third part among distances detected using the auto-focus function used by the power transmission-side imaging unit for imaging the marker may be used.

In addition, in the wireless power transmission device, a configuration in which, in a case in which a value representing a magnitude of the detected relative posture exceeds a reference value, the control unit limits transmission of the AC power to the power receiving coil using the power transmission coil may be used.

In addition, in the wireless power transmission device, a configuration in which, in a case in which the marker is imaged by the power transmission-side imaging unit, the control unit additionally detects a relative position of the power receiving coil with respect to the power transmission coil based on a imaging picture imaged by the power transmission-side imaging unit and performs transmission of the AC power to the power receiving coil using the power transmission coil based on the detection distance and the relative position that have been detected may be used.

In addition, in the wireless power transmission device, a configuration in which power receiving device identification information used for identifying the wireless power receiving device is encoded in the marker, and, in a case in which the marker is imaged by the power transmission-side imaging unit, the control unit detects the power receiving device identification information based on a imaging picture imaged by the power transmission-side imaging unit and performs transmission of the AC power to the power receiving coil using the power transmission coil based on the detected power receiving device identification information may be used.

In addition, in the wireless power transmission device, a configuration in which the power receiving device identification information is encoded in the marker in the form of a one-dimensional code or a two-dimensional code may be used.

Furthermore, a wireless power transmission system (the wireless power transmission system 1 in the example described above) according to the embodiment includes: the wireless power receiving device described above; and the wireless power transmission device performing transmission of AC power to the power receiving coil using a power transmission coil. In accordance with this, the wireless power transmission system can easily cause a relative distance of the power receiving coil with respect to the power transmission coil to coincide with a desired distance.

In addition, a wireless power transmission system (the wireless power transmission system 1 in the example described above) according to the embodiment includes: the wireless power transmission device described above; and the wireless power receiving device. In accordance with this, the wireless power transmission system can easily cause a relative distance of the power receiving coil with respect to the power transmission coil to coincide with a desired distance.

As described above, although the embodiment of the present disclosure has been described in detail with reference to the drawings, a specific configuration is not limited to this embodiment, and a change, a substitution, a deletion, and the like may be made in a range not departing from the concept of the present disclosure.

In addition, a program used for realizing the function of an arbitrary component of the device described above may be recorded on a computer-readable recording medium, and the program may be read into a computer system and be executed. Here, the corresponding device is, for example, the wireless power transmission device 10, the wireless power receiving device 20, and the like. The "computer system" described here includes an OS (Operating System) and hardware such as peripherals. In addition, "the computer-readable recording medium" represents a portable media such as a flexible disk, a magneto-optical disk, a ROM, or a CD (Compact Disk)-ROM or a storage device such as a hard disk or the like built into the computer system. In addition, the "computer-readable recording medium" may include a medium storing the program for a predetermined time such as an internal volatile memory of the computer system serving as a server or a client in a case in which the program is transmitted via a network such as the Internet or a communication line such as a telephone line.

In addition, the program described above may be transmitted from the computer system storing this program in a storage device or the like to another computer system via a transmission medium or using a transmission wave in a transmission medium. Here, the "transmission medium" transmitting a program represents a medium having an information transmission function such as a network including the internet or a communication line such as a telephone line.

In addition, the program described above may be used for realizing some of the functions described above. Furthermore, the program described above may be a program that can realize the functions described above in combination with a program that has already been recorded in the computer system, so called a differential file or a differential program.

EXPLANATION OF REFERENCES 1 wireless power transmission system
10 wireless power transmission device
11 power transmission unit
12 power transmission coil unit
20 wireless power receiving device
21 power receiving coil unit
22 power receiving unit
30 storage battery
40 motor
41 motor control unit
42 mobile body control unit
111 power transmission circuit
112 conversion circuit
113 control unit
114 communication unit
221 rectification circuit
222 control unit
223 communication unit
C1, C2 imaging unit
H1, H2 opening
L1 power transmission coil
L2 power receiving coil
M1, M2 magnetic body
MK1, MK2 marker
P power supply
P1 first part
P2 second part
P3 third part
P11 first feature point
P21 second feature point
P31 third feature point

What is claimed is:

1. A wireless power receiving device that receives AC power from a power transmission coil included in a wireless power transmission device, the wireless power receiving device comprising:
    a power receiving coil configured to receive the AC power from the power transmission coil;
    a power receiving-side imaging unit having an auto-focus function; and
    a control unit configured to cause the power receiving-side imaging unit to image a range that is able to be imaged by the power receiving-side imaging unit and, in a case in which a marker located at a predetermined first position on an outer surface of the wireless power transmission device is imaged by the power receiving-side imaging unit, to output relative distance information representing a relative distance of the power receiving coil with respect to the power transmission coil based on a detection distance detected using the auto-focus function used by the power receiving-side imaging unit for imaging the marker,
    wherein power transmission device identification information used for identifying the wireless power transmission device is encoded in the marker, and
    in a case in which the marker is imaged by the power receiving-side imaging unit, the control unit outputs the power transmission device identification information based on a imaging picture imaged by the power receiving-side imaging unit.

2. The wireless power receiving device according to claim 1, wherein the marker is a part of the outer surface of the wireless power transmission device.

3. The wireless power receiving device according to claim 2,
    wherein the wireless power transmission device includes a power transmission coil unit having the power transmission coil, and
    the marker is a part of an outer surface of the power transmission coil unit.

4. The wireless power receiving device according to claim 1, wherein the marker is a picture attached to a part of the outer surface of the wireless power transmission device.

5. The wireless power receiving device according to claim 1,
    wherein the wireless power transmission device includes a power transmission-side display unit that displays a picture, and
    the marker is a picture displayed on the power transmission-side display unit.

6. The wireless power receiving device according to claim 1, wherein, in a case in which a relative position and a relative posture between the power transmission coil and the power receiving coil are a position and a posture with which the power transmission coil and the power receiving coil face each other, the marker is located at a position overlapping a center of a imaging picture among positions in the imaging picture, in the imaging picture in which the marker is imaged by the power receiving-side imaging unit.

7. The wireless power receiving device according to claim 1, wherein, in a case in which the marker is imaged by the power receiving-side imaging unit, the control unit outputs the relative distance information based on the detection distance and outputs relative position information representing a relative position of the power receiving coil with respect to the power transmission coil based on a imaging picture imaged by the power receiving-side imaging unit.

8. The wireless power receiving device according to claim 7,
    wherein the wireless power receiving device is mounted in a mobile body, and
    the mobile body adjusts a relative position between the power transmission coil and the power receiving coil based on the relative distance information and the relative position information output from the wireless power receiving device.

9. The wireless power receiving device according to claim 1, wherein the power transmission device identification information is encoded in the marker in the form of a one-dimensional code or a two-dimensional code.

10. A wireless power transmission system comprising:
    the wireless power receiving device according to claim 1; and the wireless power transmission device performing transmission of AC power to the power receiving coil using the power transmission coil.

11. A wireless power receiving device that receives AC power from a power transmission coil included in a wireless power transmission device, the wireless power receiving device comprising:
a power receiving coil configured to receive the AC power from the power transmission coil;
a power receiving-side imaging unit having an auto-focus function;
a control unit configured to cause the power receiving-side imaging unit to image a range that is able to be imaged by the power receiving-side imaging unit and, in a case in which a marker located at a predetermined first position on an outer surface of the wireless power transmission device is imaged by the power receiving-side imaging unit, to output relative distance information representing a relative distance of the power receiving coil with respect to the power transmission coil based on a detection distance detected using the auto-focus function used by the power receiving-side imaging unit for imaging the marker; and
a power receiving-side magnetic body that is lined up with the power receiving coil in an axial direction of a first axis,
wherein the power receiving coil is a coil made of a first conductor winding spirally around the first axis, and
the power receiving-side imaging unit is located at a position not overlapping the power receiving-side magnetic body in the axial direction of the first axis.

12. The wireless power receiving device according to claim 11,
wherein the power receiving-side magnetic body has a first opening through which the first axis passes, and
the power receiving-side imaging unit is located at a position at which the entire power receiving-side imaging unit is included in the first opening in the axial direction of the first axis.

13. A wireless power receiving device that receives AC power from a power transmission coil included in a wireless power transmission device, the wireless power receiving device comprising:
a power receiving coil configured to receive the AC power from the power transmission coil;
a power receiving-side imaging unit having an auto-focus function; and
a control unit configured to cause the power receiving-side imaging unit to image a range that is able to be imaged by the power receiving-side imaging unit and, in a case in which a marker located at a predetermined first position on an outer surface of the wireless power transmission device is imaged by the power receiving-side imaging unit, to output relative distance information representing a relative distance of the power receiving coil with respect to the power transmission coil based on a detection distance detected using the auto-focus function used by the power receiving-side imaging unit for imaging the marker,
wherein the power receiving coil is a coil made of a first conductor winding helically around a first axis, and
the power receiving-side imaging unit is lined up with the power receiving coil in a first parallel direction intersecting an axial direction of the first axis and is located at a position interposed between both ends of the power receiving coil in the first parallel direction.

14. A wireless power receiving device that receives AC power from a power transmission coil included in a wireless power transmission device, the wireless power receiving device comprising:
a power receiving coil configured to receive the AC power from the power transmission coil;
a power receiving-side imaging unit having an auto-focus function; and
a control unit configured to cause the power receiving-side imaging unit to image a range that is able to be imaged by the power receiving-side imaging unit and, in a case in which a marker located at a predetermined first position on an outer surface of the wireless power transmission device is imaged by the power receiving-side imaging unit, to output relative distance information representing a relative distance of the power receiving coil with respect to the power transmission coil based on a detection distance detected using the auto-focus function used by the power receiving-side imaging unit for imaging the marker,
wherein the marker has a first part representing a first feature point and a second part representing a second feature point, and the second part is separated from the first part, and
in a case in which the marker is imaged by the power receiving-side imaging unit, the control unit detects a relative posture of the power receiving coil with respect to the power transmission coil based on a distance from the power receiving-side imaging unit to the first feature point represented by the first part and a distance from the power receiving-side imaging unit to the second feature point represented by the second part among distances detected using the auto-focus function used by the power receiving-side imaging unit for imaging the marker.

15. The wireless power receiving device according to claim 14,
wherein the marker has a third part representing a third feature point in addition to the first part and the second part,
wherein the third feature point represented by the third part is separated from a line segment connecting the first feature point represented by the first part and the second feature point represented by the second part, and
wherein, in a case in which the marker is imaged by the power receiving-side imaging unit, the control unit detects the relative posture based on the distance from the power receiving-side imaging unit to the first feature point represented by the first part, the distance from the power receiving-side imaging unit to the second feature point represented by the second part, and a distance from the power receiving-side imaging unit to the third feature point represented by the third part among distances detected using the auto-focus function used by the power receiving-side imaging unit for imaging the marker.

16. The wireless power receiving device according to claim 14, wherein the control unit outputs relative posture information representing the detected relative posture.

* * * * *